United States Patent
Kim et al.

(10) Patent No.: US 10,419,172 B2
(45) Date of Patent: Sep. 17, 2019

(54) DOWNLINK POWER ALLOCATION METHOD FOR MUST TRANSMISSION IN WIRELESS COMMUNICATION SYSTEM AND APPARATUS THEREFOR

(71) Applicant: LG ELECTRONICS INC., Seoul (KR)

(72) Inventors: Hyungtae Kim, Seoul (KR); Kijun Kim, Seoul (KR); Inkwon Seo, Seoul (KR); Seokmin Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/736,438

(22) PCT Filed: Jun. 13, 2016

(86) PCT No.: PCT/KR2016/006260
§ 371 (c)(1),
(2) Date: Dec. 14, 2017

(87) PCT Pub. No.: WO2016/208899
PCT Pub. Date: Dec. 29, 2016

(65) Prior Publication Data
US 2018/0375626 A1  Dec. 27, 2018

Related U.S. Application Data

(60) Provisional application No. 62/182,628, filed on Jun. 21, 2015, provisional application No. 62/189,708, (Continued)

(51) Int. Cl.
*H04L 5/00* (2006.01)
*H04W 88/08* (2009.01)
(Continued)

(52) U.S. Cl.
CPC .......... *H04L 5/0037* (2013.01); *H04L 5/0007* (2013.01); *H04W 52/143* (2013.01);
(Continued)

(58) Field of Classification Search
CPC .. H04L 4/0037; H04L 4/0007; H04W 52/243; H04W 52/283; H04W 72/0446;
(Continued)

(56) References Cited

U.S. PATENT DOCUMENTS

2006/0025178 A1  2/2006  Tao et al.
2009/0028105 A1  1/2009  Schaepperle
(Continued)

FOREIGN PATENT DOCUMENTS

KR  10-2011-0039172 A  4/2011
KR  10-2015-0060896 A  6/2015

*Primary Examiner* — Stephen J Clawson
(74) *Attorney, Agent, or Firm* — Birch, Stewart, Kolasch & Birch, LLP

(57) ABSTRACT

The present application discloses a method for transmitting a downlink signal by a base station in a wireless communication system. Particularly, the method comprises the steps of: distributing a total transmission power with respect to data for a short range user equipment (UE) and data for a long range UE; and transmitting the data for the short range UE through a plurality of layers, and transmitting the data for the long range UE through at least one of the plurality of layers, using the distributed transmission power, wherein the data for the short range UE and the data for the long range UE are transmitted through the same time resource and the same frequency resource, and a transmission power of the data for the short range UE distributed for each of the plurality of layers has an equal value.

10 Claims, 17 Drawing Sheets

Related U.S. Application Data filed on Jul. 7, 2015, provisional application No. 62/209,892, filed on Aug. 26, 2015, provisional application No. 62/319,275, filed on Apr. 6, 2016, provisional application No. 62/320,656, filed on Apr. 11, 2016, provisional application No. 62/341,038, filed on May 24, 2016.

(51) Int. Cl.
| | | |
|---|---|---|
| *H04W 52/28* | (2009.01) | |
| *H04W 72/04* | (2009.01) | |
| *H04W 72/08* | (2009.01) | |
| *H04W 52/14* | (2009.01) | |
| *H04W 52/34* | (2009.01) | |
| *H04W 52/24* | (2009.01) | |

(52) U.S. Cl.
CPC ....... *H04W 52/283* (2013.01); *H04W 52/346* (2013.01); *H04W 72/048* (2013.01); *H04W 72/0446* (2013.01); *H04W 72/0453* (2013.01); *H04W 72/0473* (2013.01); *H04W 72/082* (2013.01); *H04W 88/08* (2013.01); *H04W 52/243* (2013.01)

(58) Field of Classification Search
CPC ......... H04W 72/0453; H04W 72/0473; H04W 72/048; H04W 72/082
USPC .......................................................... 370/330
See application file for complete search history.

(56) References Cited

U.S. PATENT DOCUMENTS

| | | | |
|---|---|---|---|
| 2011/0250899 A1 | 10/2011 | Vajapeyam et al. | |
| 2016/0065401 A1* | 3/2016 | Jia .............................. | H04L 5/02 375/298 |
| 2016/0128088 A1* | 5/2016 | Abdoli .............. | H04W 72/1289 370/329 |
| 2016/0204969 A1* | 7/2016 | Zhu ..................... | H04L 27/3405 375/261 |
| 2017/0048841 A1* | 2/2017 | Hwang ................ | H04L 5/0044 |
| 2017/0099098 A1* | 4/2017 | Lin ..................... | H04B 7/0639 |

\* cited by examiner (a) Control-Plane Protocol Stack (b) User-Plane Protocol Stack

DOWNLINK POWER ALLOCATION METHOD FOR MUST TRANSMISSION IN WIRELESS COMMUNICATION SYSTEM AND APPARATUS THEREFOR

CROSS REFERENCE TO RELATED APPLICATIONS

This application is the National Phase of PCT International Application No. PCR/KR/2016/006260, filed on Jun. 13, 2016, which claims priority under 35 U.S.C. 119(c) to U.S. Provisional Application No. 62/182,628, filed on Jun. 21, 2015, No. 62/189,708, filed on Jul. 7, 2015, No. 62/209,892, filed on Aug. 26, 2015, No. 62/319,275, filed on Apr. 6, 2016, No. 62/320,656, filed on Apr. 11, 2016, and No. 62/341,038, filed on May 24, 2016, all of which are hereby expressly incorporated by reference into the present application.

TECHNICAL FIELD

The present invention relates to a wireless communication system and, more specifically, to a downlink power allocation method for MUST in a wireless communication system, and an apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 MHz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies in a downlink power allocation method for MUST in a wireless communication system, and an apparatus therefor.

Technical Solution

In an aspect of the present invention, a method of transmitting a downlink signal by a base station in a wireless communication system includes: allocating total transmit power to data for a near UE and data for a far UE; and transmitting the data for the near UE through a plurality of layers and transmitting the data for the far UE through at least one of the plurality of layers using the allocated transmit power, wherein the data for the near UE and the data for the far UE are transmitted through the same time resources and the same frequency resources, and transmit power of the data for the near UE is allocated as the same value for each of the plurality of layers.

Preferably, the method may further include transmitting, to the near UE, information on a first ratio of the transmit power of the data for the near UE to the total transmit power and information on a second ratio of interference power to the total transmit power.

More preferably, the allocating of the total transmit power may include: allocating the transmit power of the data for the near UE as the same value for each of the plurality of layers on the basis of the first ratio information; and allocating transmit power of the data for the far UE for at least one of the layers on the basis of the second ratio information.

In this case, when the data for the far UE is transmitted through two or more of the plurality of layers, the information on the second ratio of the interference power to the total transmit power may be equally applied to the two or more layers.

Alternatively, when the data for the far UE is transmitted through two or more of the plurality of layers, the second ratio information may be provided for each of the two or more layers.

According to another aspect of the present invention, a base station in a wireless communication system includes: a wireless communication module for transmitting/receiving signals to/from a near UE and a far UE; and a processor for processing the signals, wherein the processor is configured to allocate total transmit power to data for the near UE and data for the far UE, to control the wireless communication module to transmit the data for the near UE through a plurality of layers using the allocated transmit power and controls the wireless communication module to transmit the data for the far UE through at least one of the plurality of layers, wherein the data for the near UE and the data for the far UE are transmitted through the same time resources and the same frequency resources, and the processor allocates transmit power of the data for the near UE as the same value for each of the plurality of layers.

Preferably, the processor may control the wireless communication module to transmit, to the near UE, information on a first ratio of the transmit power of the data for the near UE to the total transmit power and information on a second ratio of interference power to the total transmit power.

More preferably, the processor may allocate the transmit power of the data for the near UE as the same value for each of the plurality of layers on the basis of the first ratio information and allocate transmit power of the data for the far UE for at least one of the layers on the basis of the second ratio information.

In this case, when the data for the far UE is transmitted through two or more of the plurality of layers, the information on the second ratio of the interference power to the total transmit power may be equally applied to the two or more layers or may be provided for each of the two or more layers.

Particularly, the first ratio information and the second ratio information may satisfy the following equation.

$$\frac{1}{n}\sum_{i=1}^{n}(a_s + a_{il})_{=1}$$ ⟨Equation⟩

(Here, $a_S$ is the first ratio information which is an integer equal to or greater than 0, $a_{il}$ is the second ratio information which is an integer equal to or greater than 0, i is an index of the plurality of layers and n is a rank value of the near UE.)

Advantageous Effects

According to embodiments of the present invention, power can be efficiently allocated for MUST in a wireless communication system.

It will be appreciated by persons skilled in the art that the effects that can be achieved with the present disclosure are not limited to what has been particularly described hereinabove and other advantages of the present disclosure will be more clearly understood from the following detailed description.

BEST MODE FOR CARRYING OUT THE INVENTION

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system. In addition, while the embodiments of the present disclosure are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
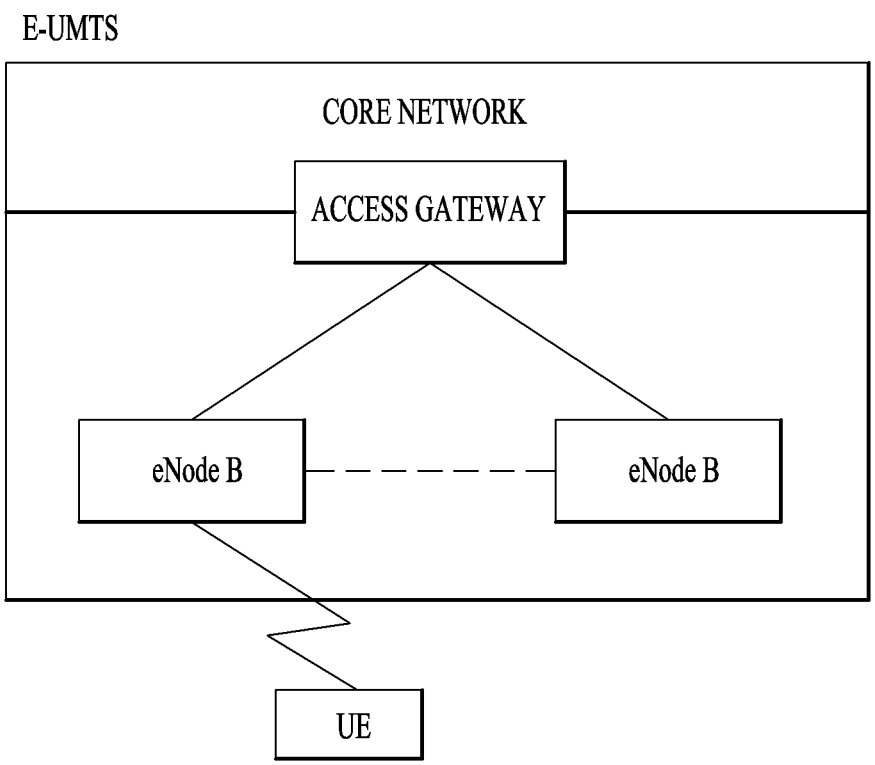
FIG. 1 illustrates a configuration of an Evolved Universal Mobile Telecommunications System (E-UMTS) network as an example of a wireless communication system.
Figure 2:
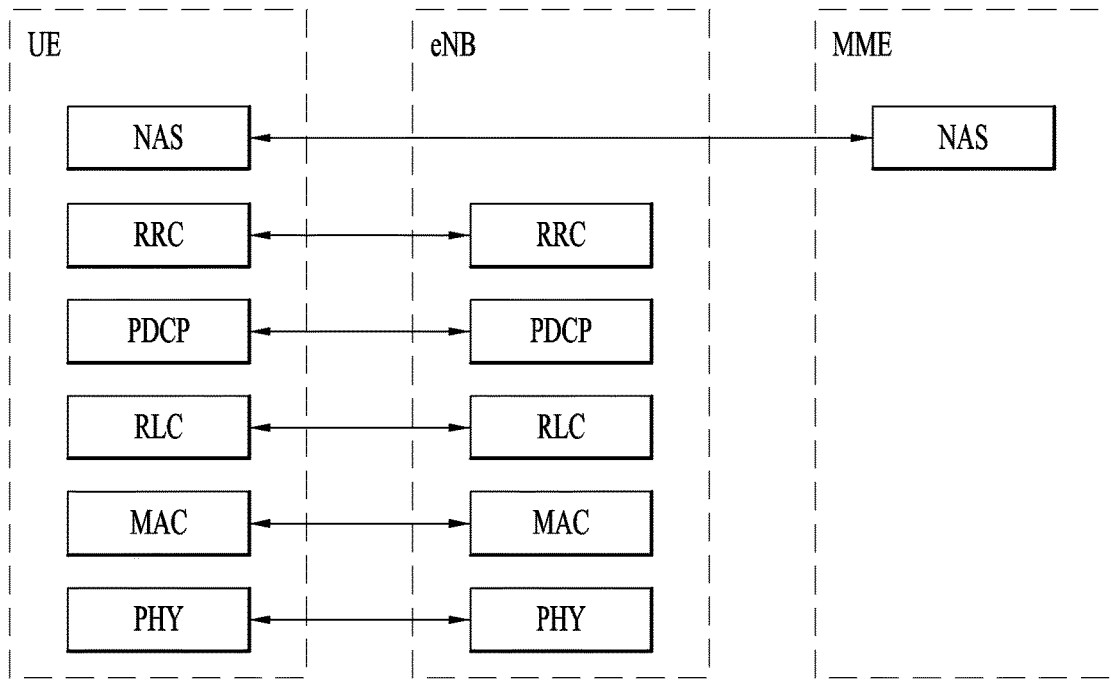
FIG. 2 illustrates a control-plane protocol stack and a user-plane protocol stack in a radio interface protocol architecture conforming to a 3rd Generation Pal tuership Project (3GPP) radio access network standard between a User Equipment (UE) and an Evolved UMTS Terrestrial Radio Access Network (E-UTRAN).
Figure 2:
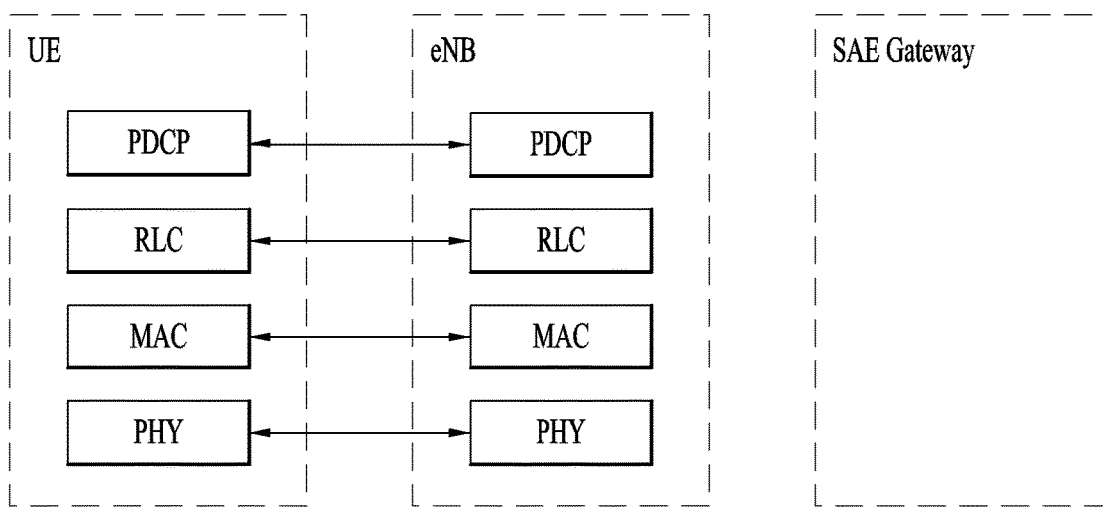

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer.

A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell which configures an eNB is set to one of 1.25, 2.5, 5, 10, 15 and 20 MHz and provides a downlink or uplink transmission service to multiple UEs. Different cells may be configured to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
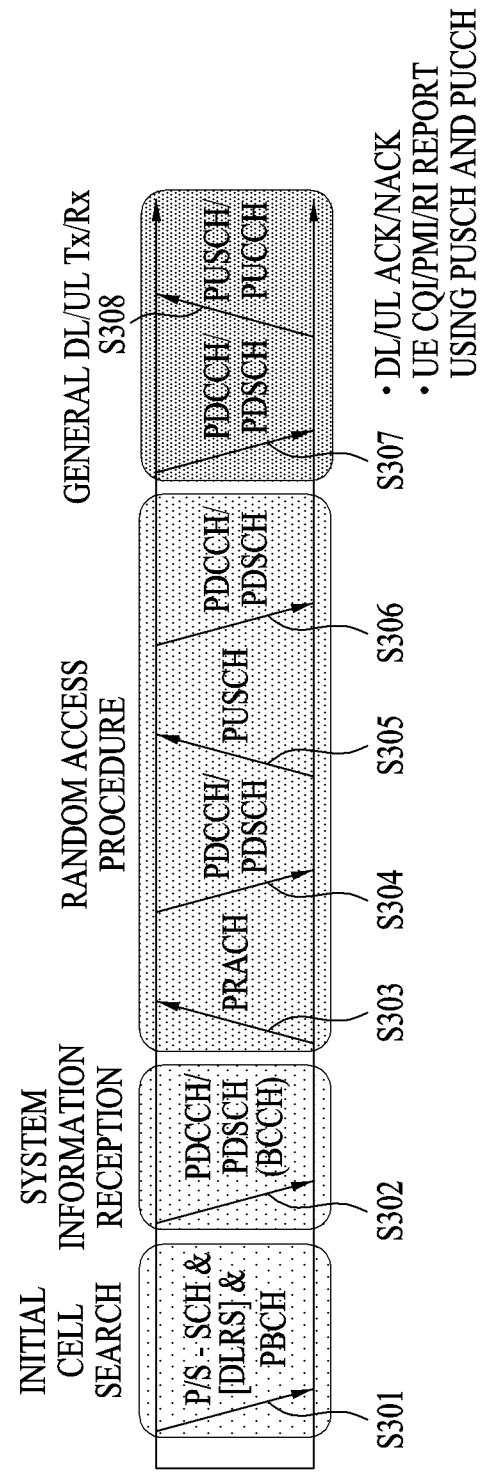
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
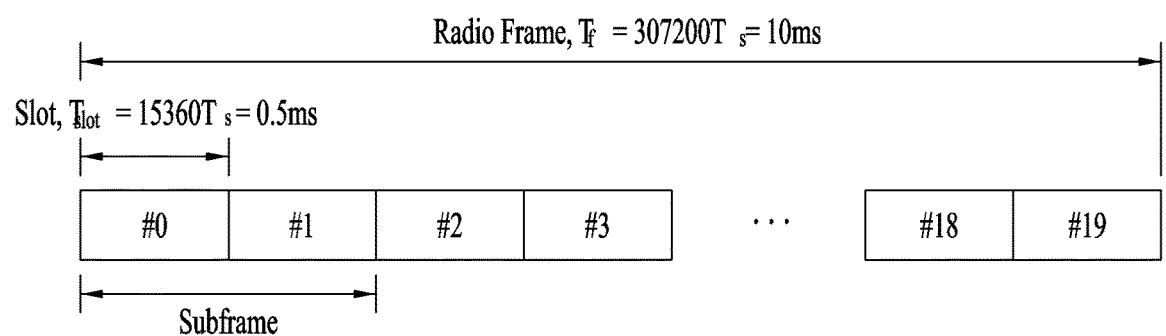
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1ms long and further divided into two slots. Each time slot is 0.5 ms ($15360 \times T_s$) long. Herein, $T_s$ represents a sampling time and $T_s=1/(15 \text{ kHz}\times 2048)=3.2552\times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
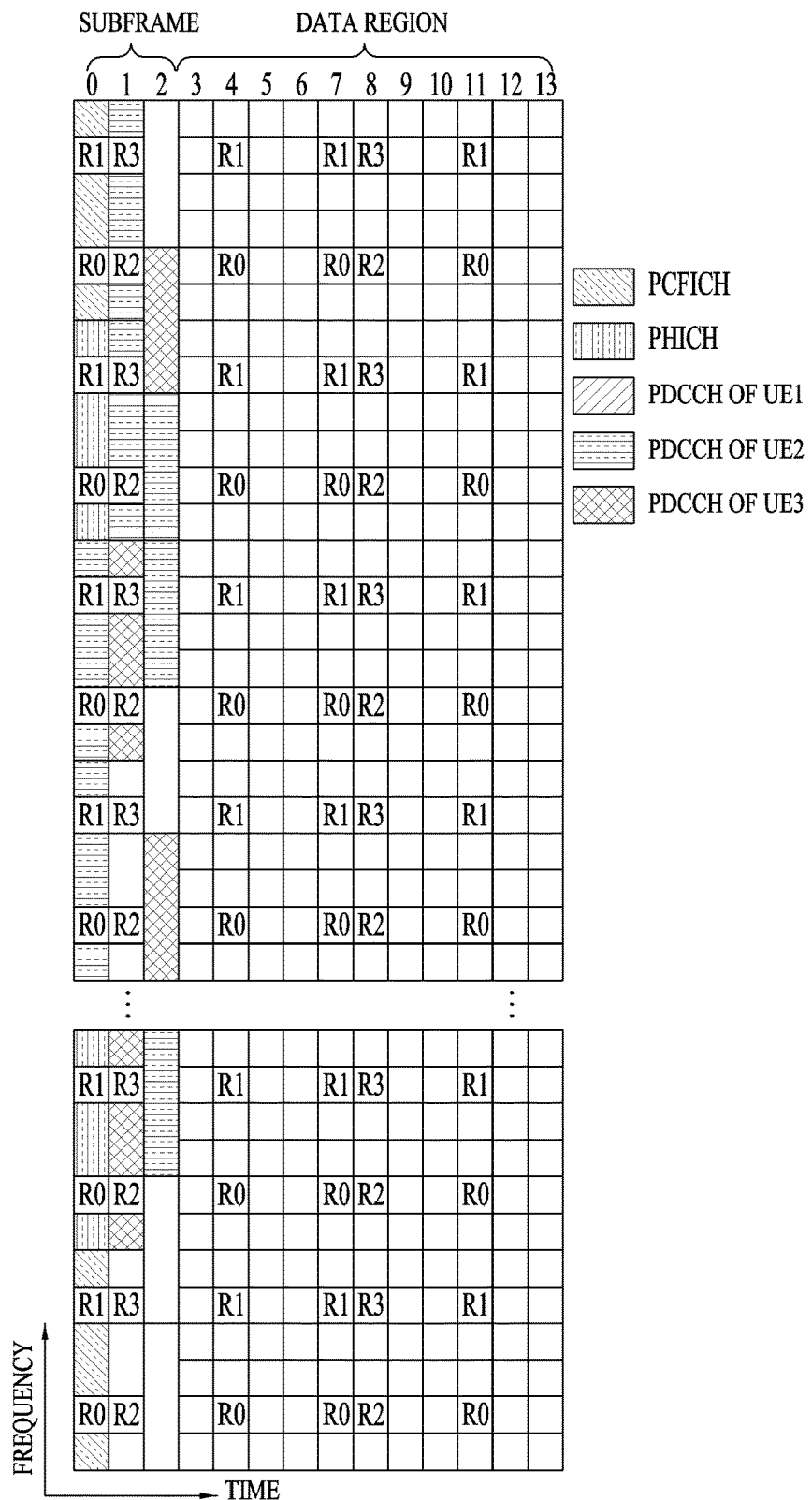
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
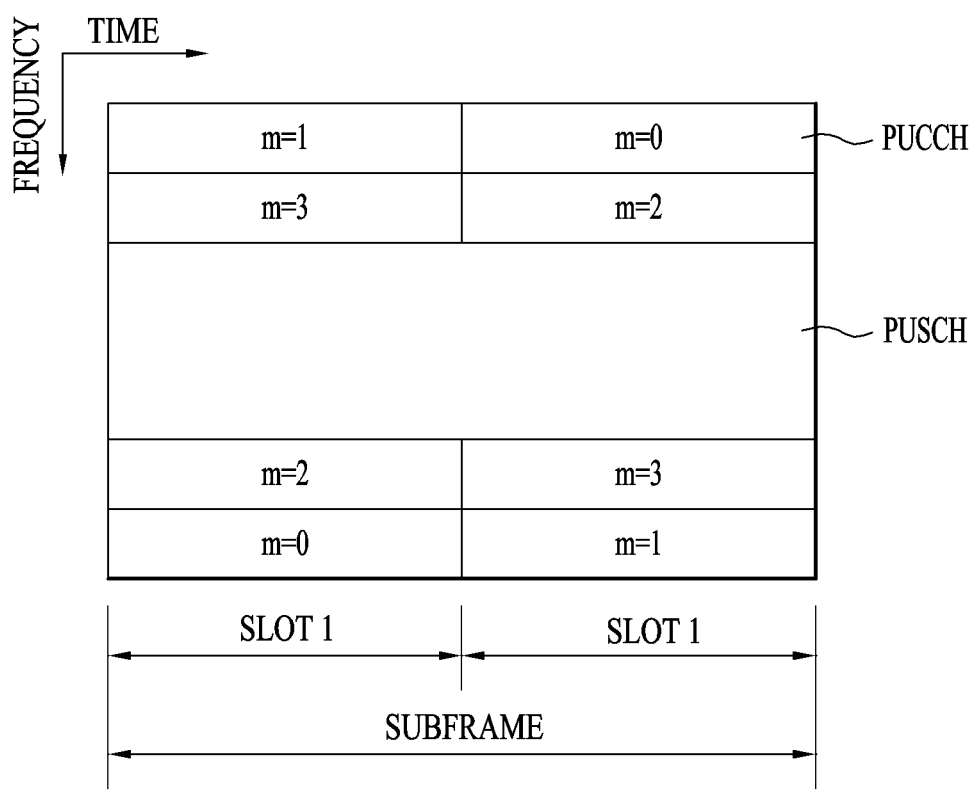
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

The present invention is a method relating to signaling and detailed operations necessary for an interference cancellation receiver of a MUST (Multi-User Superposition Transmission) system. MUST refers to a multiple access scheme for allocating a plurality of UEs to the same frequency-time resource using a power ratio which is additionally considered in advance, distinguished from conventional OFDMA systems in which resources are allocated in the frequency-time domain, and mitigating previously considered inter-user interference through an interference cancellation receiver on the assumption that signals are transmitted to the interference cancellation receiver, thereby obtain large bandwidth efficiency. MUST is discussed as an important candidate technique of the future 5G system.

Major technology for the MUST system can be divided into a resource allocation method of a base station and an interference cancellation method of a UE. In particular, receivers may be divided into a symbol level interference cancellation (SIC) receiver represented by an ML (maximum likelihood) receiver and a codeword level interference cancellation (CWIC) receiver represented by an L-CWIC (MMSE based linear CWIC) and ML-CWIC receivers according to interference cancellation methods of a UE. A reception gain in a given environment depends on an interference cancellation method. In general, a gain when the ML technique is applied and a gain of a CWIC receiver are high in proportion to UE implementation complexity.

Figure 7:
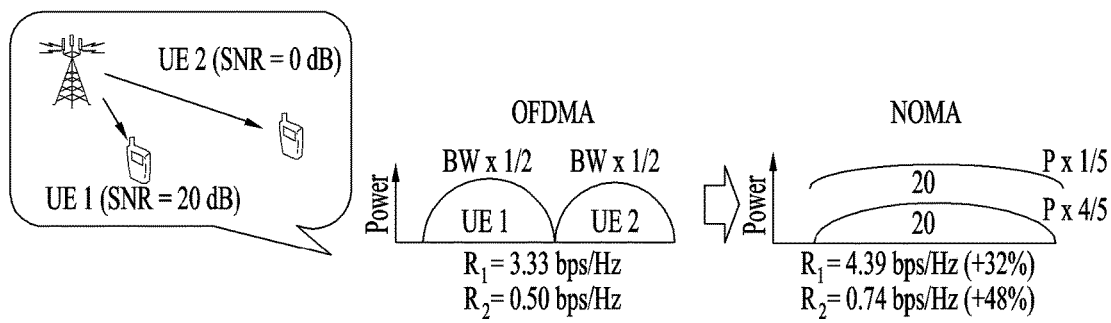
FIGS. 7 and 8 illustrate the concept of an interference cancellation technique in a MUST system.
Figure 8:
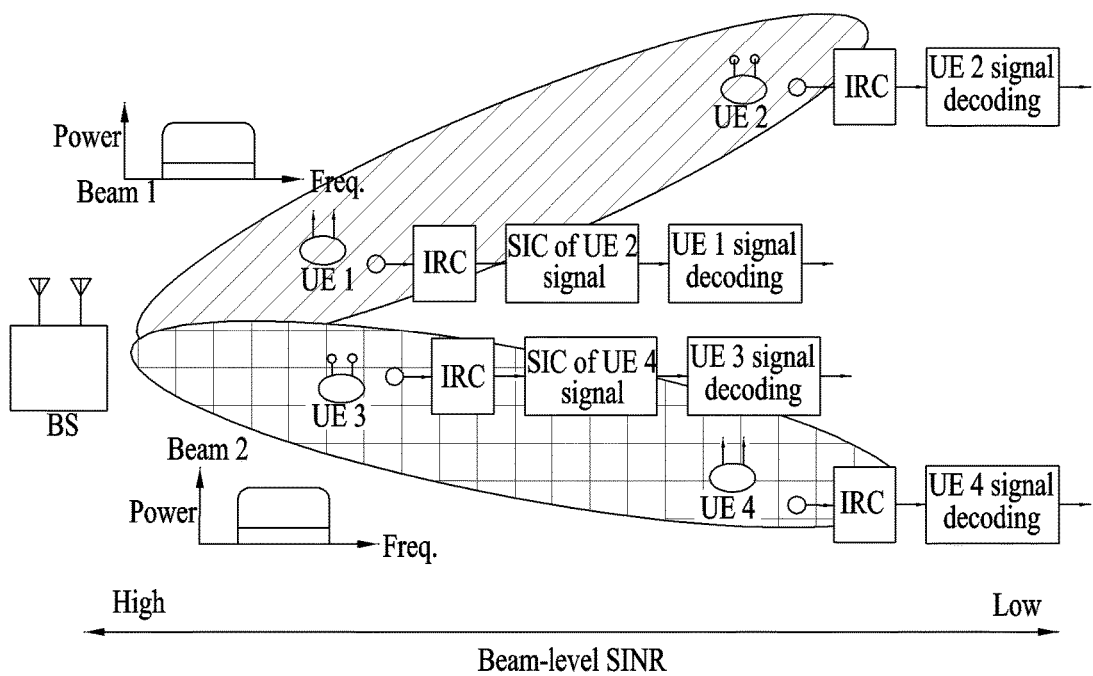

FIGS. 7 and 8 illustrate the concept of interference cancellation in a MUST system.

FIG. 7 conceptually illustrates a difference between the conventional OFDMA system and the MUST system. In particular, it is assumed that UE1 has an SNR of 20 dB and UE2 has an SNR of 0 dB in FIG. 7.

Specifically, in the conventional OFDMA system, UE1 and U2 share the bandwidth on halves, that is, receive downlink signals of the same power through different frequency bands. In this case, a data rate per frequency is 3.33 bps/Hz for UE1 and 0.5 bps/Hz for UE2. Under the same conditions, UE1 and UE2 use the entire bandwidth, ⅘th of total transmit power is allocated to UE2 and ⅕th thereof is allocated to UE1 in the MUST system. In this case, a data rate per frequency increases to 4.39 bps/Hz for UE1 and to 0.74 bps/Hz for UE2.

FIG. 8 schematically illustrates a signal reception procedure in the MUST system. Specifically, a base station (BS) applies the same beamforming to UE1 and UE2 with the same time/frequency resources and transmits signals. In this case, UE2 also receives a signal destined for UE1 but the influence of the signal is insignificant due to a reception power difference, and thus can decode a signal destined for UE2 by applying only an interference rejection combining (IRC) algorithm. However, UE1 can decode the signal destined therefor after performing a procedure of removing the transmitted signal destined for UE2, that is, an SIC process for the signal destined for UE2, in addition to the IRC algorithm.

Similarly, the BS applies the same beamforming to UE3 and UE4 with the same time/frequency resources and transmits signals. In this case, UE4 also receives a signal destined for UE3 but the influence of the signal is insignificant due to a reception power difference, and thus can decode a signal destined for UE4 by applying only the IRC algorithm. However, UE3 can decode the signal destined therefor after performing a procedure of removing the transmitted signal destined for UE4, that is, an SIC process for the signal destined for UE4, in addition to the IRC algorithm.

Prior to description of the present invention, downlink power control of 3GPP LTE will be described.

First, downlink power control in CRS based transmission will be described.

In 3GPP LTE, an energy per resource element (EPRE) which is an energy value per resource element is defined for downlink resource power allocation. Here, a reference value is an EPRE for a cell-specific reference signal (CRS), and this CRS EPRE is determined as a higher layer signal and has a fixed value in a downlink system bandwidth and subframes.

An EPRE for resources of a PDSCH on which actual data is transmitted can be represented as a ratio to the CRS EPRE. For example, a CRS EPRE to a PDSCH EPRE in OFDM symbols in which a CRS is not present is defined as $\rho_A$ and a CRS EPRE to a PDSCH EPRE in OFDM symbols in which a CRS is present is defined as $\rho_B$.

Figure 9:
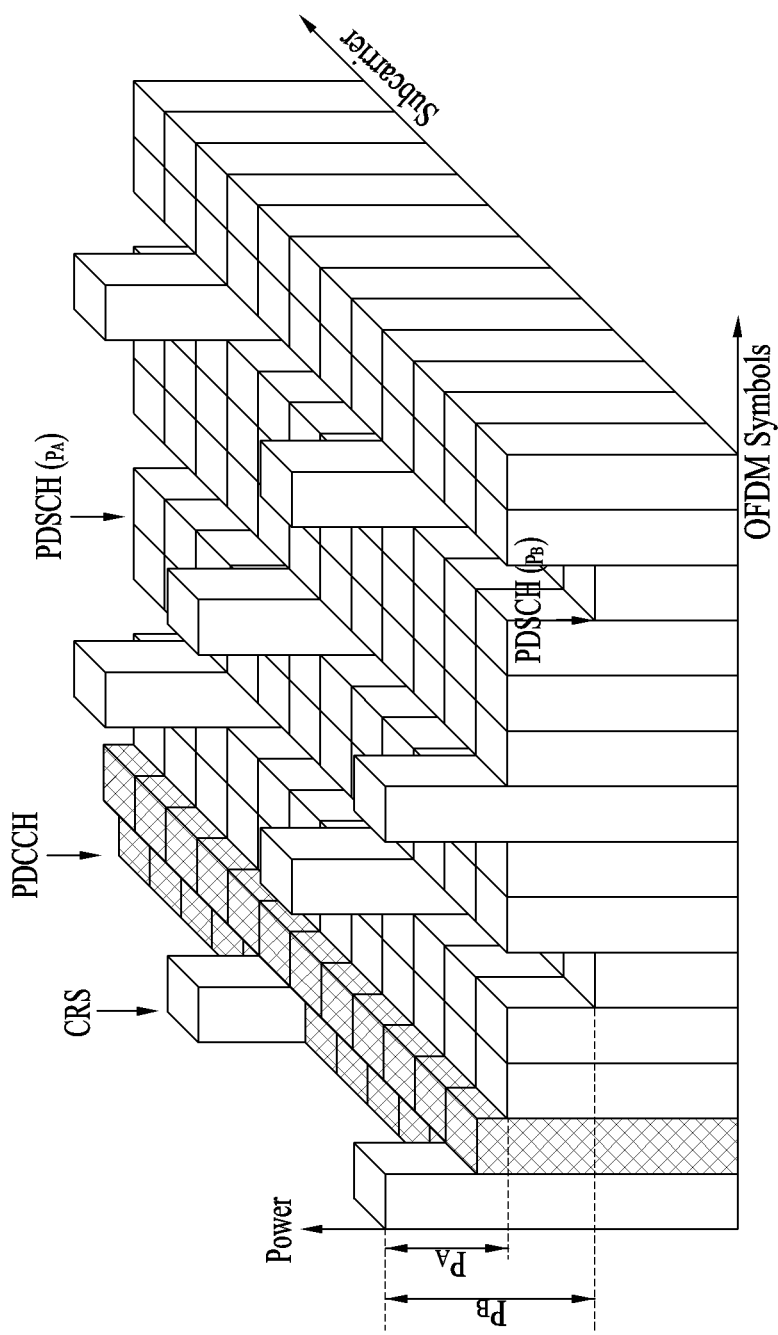
FIG. 9 illustrates a power allocation concept in an LTE system.

FIG. 9 illustrates a power allocation concept in LTE. Particularly, FIG. 9 shows a coordinate system in which the horizontal axis represents OFDM symbols, the vertical axis represents subcarriers and the height represents power.

In FIG. 9, $\rho_A$ is determined by a power offset $\delta_{power-offset}$ according to whether multi-user MIMO is applied and a UE-specific parameter $\rho_A$, and $\rho_B/\rho_A$ is determined by the number of antenna ports and a cell-specific parameter $P_B$. Particularly, the cell-specific parameter $P_B$ is defined depending on the number of antenna ports as shown in Table 1.

TABLE 1

| $P_B$ | $\rho_B/\rho_A$ | |
|---|---|---|
| | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

In the current LTE system, $\rho_A$ is differently defined for two cases. In PDSCH data transmission using 4-port CRS based transmit diversity, $\rho_A$ is determined by Equation 1.

$$\rho_A = \delta_{power-offset} + P_A + 10\log_{10}(2)_{[dB]} \quad \text{[Equation 1]}$$

In Equation 1, $\delta_{power-offset}$ indicates a power offset value in case of PDSCH transmission through multi-user MIMO and is set to 0 dB in other PDSCH transmission schemes. In addition, $P_A$ refers to a UE-specific parameter as described above. $\rho_A$ in a case other than the aforementioned 4-port CRS transmit diversity based PDSCH transmission case is defined by Equation 2.

$$\rho_A = \delta_{power-offset} + P_A \ [dB] \quad \text{[Equation 2]}$$

Hereinafter, a PDSCH EPRE is described as data power.

In the above-described manner, a UE calculates $\rho_A$ and $\rho_B$ using $P_A$ and $P_B$ values and calculates data power P from CRS receive power. Then, the UE calculates data power per layer using a PMI. As shown in Table 2, the Frobenius norm of a precoding matrix is normalized to 1 and the norm of each vector forming the precoding matrix is fixed to $$\frac{1}{\sqrt{n}}$$

in order to distribute the same data power per layer in the current LTE standard document. Here, n is a rank value of a PDSCH. Accordingly, the UE calculates data power of each layer as P/n.

TABLE 2

| Codebook index | Number of layers υ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&2\\j&-j\end{bmatrix}$ |
| 3 | $\frac{1}{\sqrt{2}}\begin{bmatrix}1\\-j\end{bmatrix}$ | — |

Figure 10:
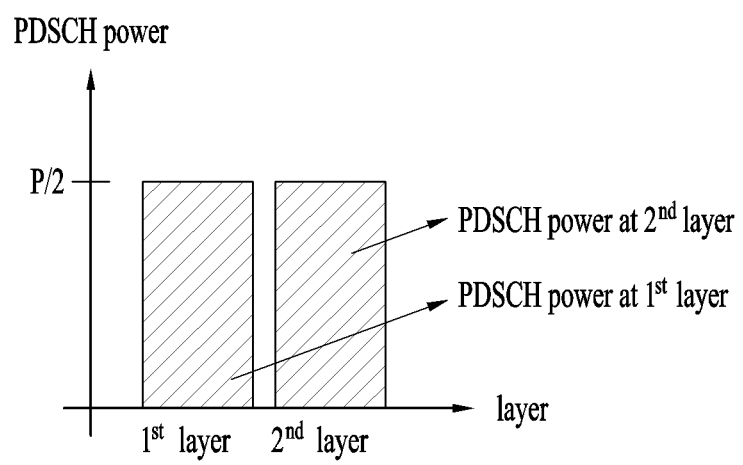
FIG. 10 illustrates data power per layer of a UE having rank 2 during CRS based multilayer transmission.

FIG. 10 illustrates data power per layer of a UE having a rank of 2 in CRS based multilayer transmission.

Referring to FIG. 10, the UE has a rank of 2 and receives a PDSCH corresponding to a downlink signal through two layers. In this case, data power of each layer is P/2.

Next, downlink power control in DM-RS based transmission will be described.

In the case of DM-RS based multilayer transmission, data power of each layer is detected through DM-RS receive power of a DM-RS antenna port corresponding to each layer. According to the current 3GPP standard document, a UE assumes that the ratio of data power of an i-th layer to DM-RS receive power of a DM-RS antenna port corresponding to the i-th layer is 0 dB (i.e., identical) when the receive rank of the UE is 2 or lower and assumes that the ratio of the data power of the i-th layer to the DM-RS receive power of the DM-RS antenna port corresponding to the i-th layer is −3 dB when the receive rank of the UE is 3 or higher. In addition, the UE calculates a PDSCH EPRE, that is, data power, in each symbol using a $P_B$ value indicating the ratio of data power in a symbol in which a CRS is present to data power in a symbol in which the CRS is not present. In the case of DM-RS based transmission, a BS may set different data powers for respective layers, distinguished from CRS based transmission.

Figure 11:
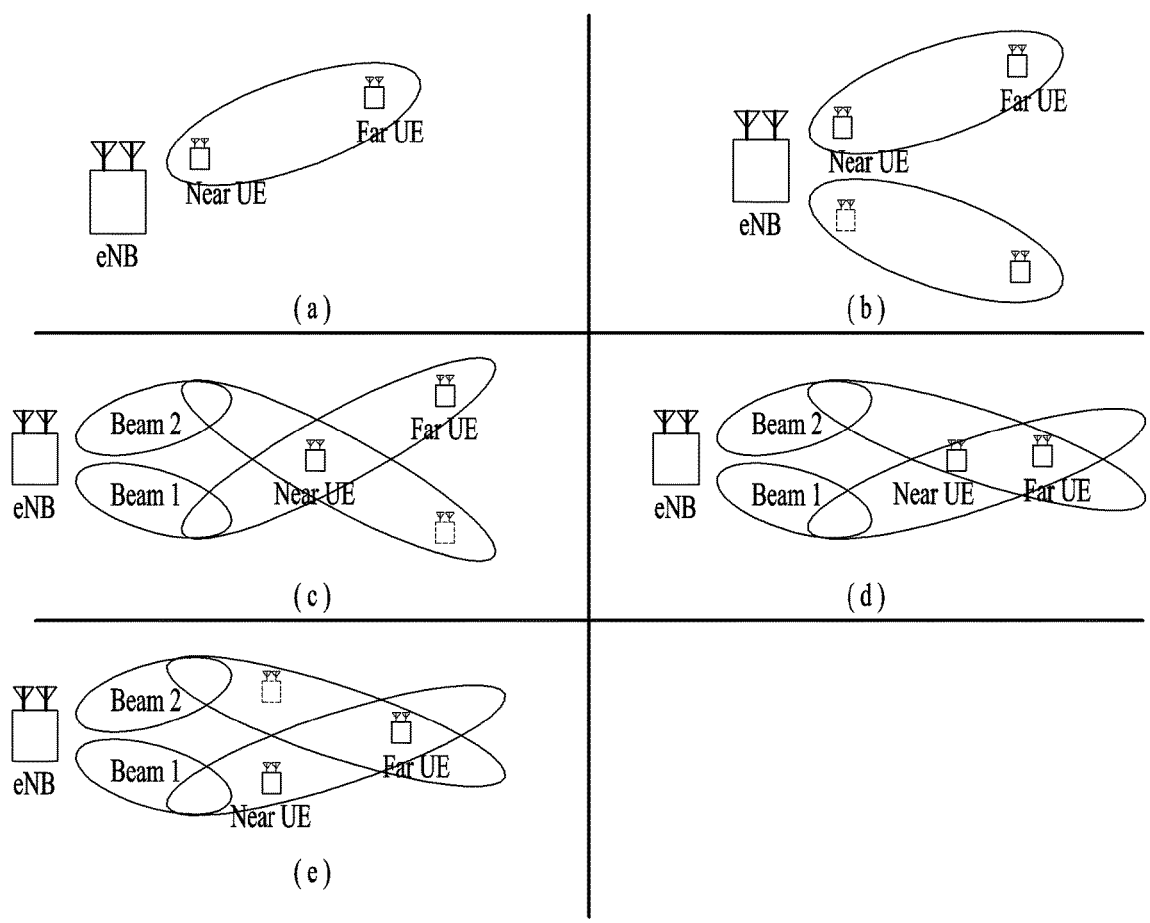
FIG. 11 illustrates a MUST UE scheduling case in which a 2Tx eNB is applicable.

FIG. 11 illustrates a MUST UE scheduling case in which a 2Tx eNB is applicable. In particular, FIGS. 11(c) and 11(d) in which a near UE is provided with a downlink service with rank 2 are exemplified in the present invention. In addition, a case in which each UE is provided with a downlink service in CRS based transmission is assumed.

In FIGS. 11(c) and 11(d), the near UE receives data through beam 1 and beam 2. Beam i refers to an i-th layer. In FIG. 11(c), there are two far UEs which respectively receive rank-1 data through beam 1 and beam 2. That is, data of one far UE and data corresponding to the first layer of the near UE are superposition coded (SPC) and transmitted through beam 1 and data of the other far UE and data corresponding to the second layer of the near UE are superposition coded and transmitted through beam 2.

If only the upper far UE exists and the lower far UE disappears in FIG. 11(c), the data of the far UE and the data corresponding to the first layer of the near UE are superposition coded and transmitted through beam 1 and only the data corresponding to the second layer of the near UE is transmitted through beam 2.

In FIG. 11(d), a far UE performs rank-2 data reception through beam 1 and beam 2. That is, data corresponding to the first layer of the far UE and data corresponding to the first layer of the near UE are superposition coded and transmitted through beam 1 and data corresponding to the second layer of the far UE and data corresponding to the second layer of the near UE are superposition coded and transmitted through beam 2.

First Embodiment—Data Power Calculation Method of Near/Far UEs in CRS Based MUST A PDSCH power calculation method of near/far UEs in FIGS. 11(c) and 11(d) will be described. First, a near/far UE calculates $\rho_A$ and $\rho_B$ using $P_A$ and $P_B$ values and calculates PDSCH receive power P using CRS receive power. Then, the near/far UE calculates PDSCH receive power of each layer through one of the following methods.

PDSCH Power Calculation Method (1) of near UE

In the first method, on the assumption that P is equally distributed to layers of the near UE, power of a far UE layer and a near UE layer is redistributed in a specific layer in which SPC with respect to a far UE has been applied. For example, when the rank of the near UE is n, the near UE assumes that power corresponding to P/n is equally distributed to each layer thereof. Here, when SPC has been applied to the first layer, the near UE calculates power of data thereof and power of far UE data as P/n*$a_{1S}$ and P/n*$a_{1I}$ in the first layer. In a layer to which SPC is not applied, the near UE calculates data power thereof as P/n. Here, $a_{iS}$ and $a_{iI}$ respectively refer to a power ratio of data of the UE transmitted through the i-th layer and a power ratio of a superposition coded interference signal. In addition, it is desirable that $a_{iS}$ and $a_{iI}$ satisfy all of the conditions of Equation 3.

$$a_{iS}+a_{iI}=1,\ a_{iS}\geq 0,\ \text{and}\ a_{iI}\geq 0\ \text{for}\ 0<i<n+1 \qquad \text{[Equation 3]}$$

The UE receives $a_{iS}$, $a_{iI}$ and index i from a BS through DCI or RRC signaling or detects the same through blind detection (BD). When the UE performs blind detection, the BS can limit a search range of $a_{iS}$, $a_{iI}$ and index i and notify the UE of the limited search range to reduce BD complexity.

If $a_{jS}$=1 or $a_{jI}$=0, the UE assumes that SPC has not been applied to a j-th layer and data power of the layer is P/n. If the BS does not signal $a_{jS}$, $a_{jI}$ and index j, the UE assumes that $a_{jS}$=1 or $a_{jI}$=0, SPC has not been applied to the j-th layer and data power of the layer is P/n.

Alternatively, the BS signals the number of layers to which SPC is applied, k, and the UE assumes that SPC has been applied to $1^{st}$, $2^{nd}$, $3^{rd}$, ..., $k^{th}$ layers among reception layers thereof and SPC has not been applied to other layers. In addition, layers to which SPC has been applied may be limited such that they always satisfy the condition of $a_{iS}=a_{jS}$ or $a_{iI}=a_{jI}$ (i≠j) for simplified power distribution.

For example, when the BS signals $a_{1S}$=0.2, $a_{1I}$=0.8, k=2 and n=3, the UE assumes that SPC has been applied to the $1^{st}$ and $2^{nd}$ layers, $a_{1S}=a_{2S}$=0.2 and $a_{1I}=a_{2I}$=0.8 and calculates data power and interference power. In addition, the UE assumes that SPC has not been applied to the remaining $3^{rd}$ layer and data power of the layer is P/3.

Alternatively, the BS signals the number of layers to which SPC is applied, k, and the UE detects a layer to which SPC has been applied among n reception layers thereof through blind detection (BD).

To simplify signaling or blind detection of MUST related information, a UE expects that a BS applies SPC to all layers and transmits the same or does not apply SPC to all layers and transmits the same. Otherwise, the UE expects that the BS performs MUST scheduling on layers to which SPC has been applied using the same value. For example, the UE expects that the above-proposed power distribution value or interference PDSCH power, MCS, resource allocation and the like are equally applied to all layers to which SPC has been applied.

Figure 12:
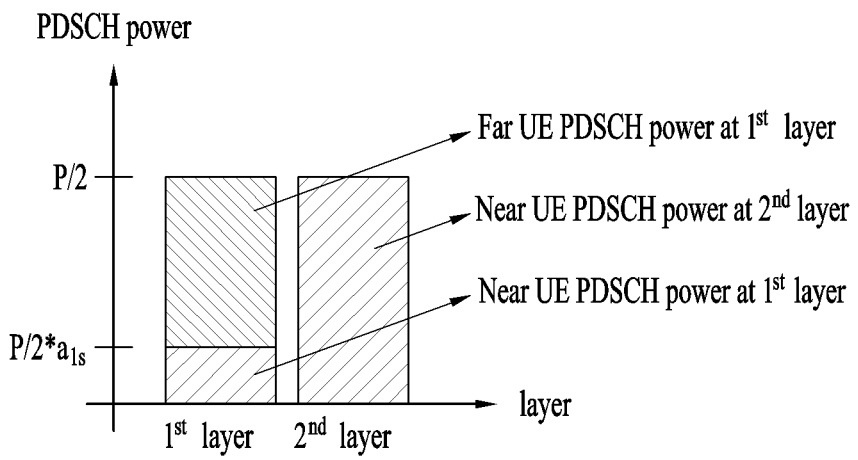
FIG. 12 illustrates an example of calculating PDSCH power of a near UE using a PDSCH power calculation method (1) of a near UE according to a first embodiment of the present invention.

FIG. 12 illustrates an example of calculating PDSCH power of a near UE using the PDSCH power calculation method (1) of a near UE according to a first embodiment of the present invention. Particularly, FIG. 12 assumes a case in which only the upper far UE exists and the lower far UE disappears in FIG. 11(c).

Figure 13:
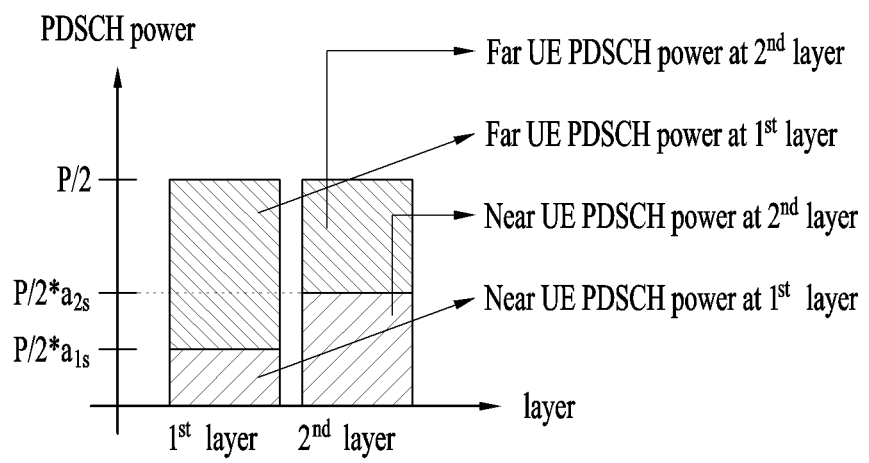
FIG. 13 illustrates another example of calculating PDSCH power of a near UE using the PDSCH power calculation method (1) of a near UE according to the first embodiment of the present invention.

FIG. 13 illustrates another example of calculating PDSCH power of a near UE using the PDSCH power calculation method (1) of a near UE according to the first embodiment of the present invention. Particularly, FIG. 13 assumes a case in which both the upper and lower far UEs exist in FIG. 11(c) and the case of FIG. 11(d).

PDSCH Power Calculation Method (2) of Near UE

In the second method, the UE assumes the same data power thereof in layers as P/n*$a_S$ and assumes that P/n*$a_I$ is used in the i-th layer for far UE data transmission.

For example, when the rank of the near UE is n, the near UE assumes that power corresponding to P*$a_S$/n is equally distributed to the layers thereof. Here, when SPC has been applied to the first layer, the near UE respectively calculates power of data thereof and power of far UE data as P/n*$a_S$ and P/n*$a_{1I}$ in the first layer. The near UE calculates data power thereof as P*$a_S$/n in a layer to which SPC is not applied.

$a_S$ refers to the ratio of power used to transmit data of the near UE to P and $a_{iI}$ refers to the ratio of power of a superposition coded interference signal transmitted through the i-th layer of the UE to P/n. Preferably, $a_S$ and $a_{1I}$ satisfy all of the conditions of Equation 4.

$$\frac{1}{n}\sum_{i=1}^{n}(a_s + a_{iI}) = 1, a_s \geq 0,$$ [Equation 4]

and $a_{iI} \geq 0$ for $0 < i < n+1$

The UE receives $a_S$, $a_{iI}$ and index i from a BS through DCI or RRC signaling or detects the same through blind detection (BD). When the UE performs blind detection, the BS can limit a search range of $a_S$, $a_{iI}$ and index i and notify the UE of the limited search range to reduce BD complexity.

If $a_S$=1, the UE assumes that SPC has not been applied to all layers and data power of each layer is P/n. If $a_{jI}$=0, the UE assumes that SPC has not been applied to the j-th layer and data power of the layer is P/n*$a_S$. When the BS does not signal $a_{jI}$ and index j, the UE assumes that $a_{jI}$=0, SPC has not been applied to the j-th layer and data power of the layer is P/n*$a_S$.

Alternatively, the BS signals the number of layers to which SPC is applied, k, and the UE assumes that SPC has been applied to $1^{st}$, $2^{nd}$, $3^{rd}$, ..., $k^{th}$ layers among reception layers thereof and SPC has not been applied to other layers. In addition, layers to which SPC has been applied may be limited such that the condition of $a_{iI}$=$a_{jI}$(i≠j) is always satisfied for simplified power distribution. For example, when the BS signals $a_S$=0.4, $a_{1I}$=0.9, k=2 and n=3, the UE assumes that SPC has been applied to the $1^{st}$ and $2^{nd}$ layers, $a_S$=0.4 and $a_{1I}$=$a_{2I}$=0.9 and calculates data power and interference power. In addition, the UE assumes that SPC has not been applied to the remaining layer and data power of the layer is P/3*$a_S$. Alternatively, the BS signals the number of layers to which SPC is applied, k, and the UE detects a layer to which SPC has been applied among n reception layers thereof through blind detection (BD).

To simplify signaling or blind detection of MUST related information, a UE expects that a BS will apply SPC to all layers and transmit the same or will not apply SPC to all layers and transmit the same. Otherwise, the UE expects that the BS will perform MUST scheduling on layers to which SPC has been applied using the same value. For example, the UE expects that the above-proposed power distribution value or interference PDSCH power, MCS, resource allocation and the like will be equally applied to all layers to which SPC has been applied.

Figure 14:
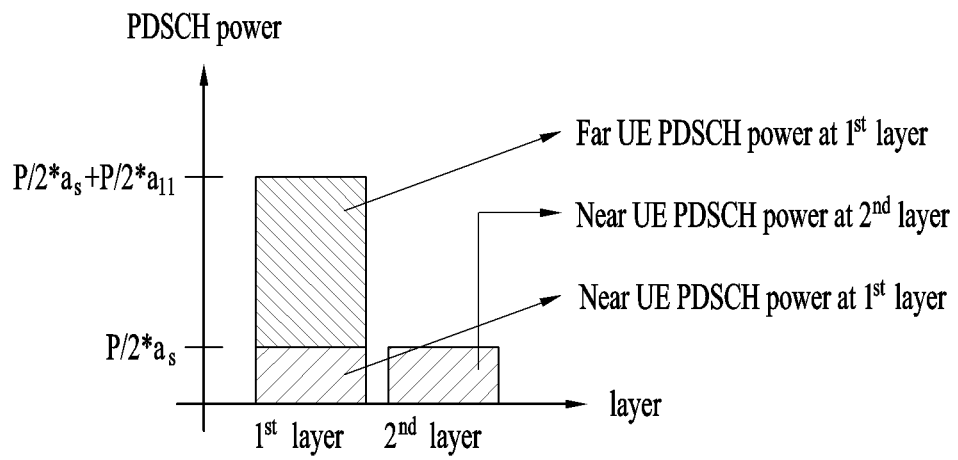
FIG. 14 illustrates an example of calculating PDSCH power of a near UE using a PDSCH power calculation method (2) of a near UE according to the first embodiment of the present invention.

FIG. 14 illustrates an example of calculating PDSCH power of a near UE using the PDSCH power calculation method (2) of a near UE according to the first embodiment of the present invention. Particularly, FIG. 14 assumes a case in which only the upper far UE exists and the lower far UE disappears in FIG. 11(*c*).

Figure 15:
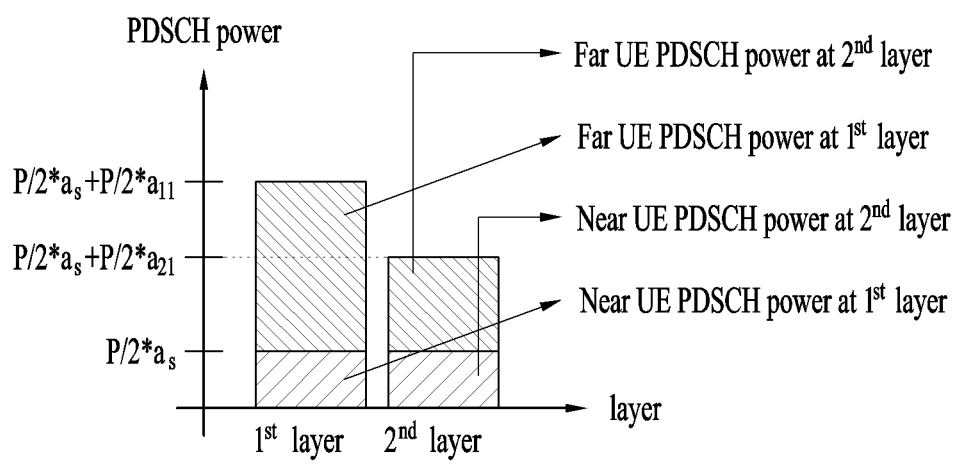
FIG. 15 illustrates another example of calculating PDSCH power of a near UE using the PDSCH power calculation method (2) of a near UE according to the first embodiment of the present invention.

FIG. 15 illustrates another example of calculating PDSCH power of a near UE using the PDSCH power calculation method (2) of a near UE according to the first embodiment of the present invention. Particularly, FIG. 15 assumes a case in which both the upper and lower far UEs exist in FIG. 11(*c*) and the case of FIG. 11(*d*).

PDSCH Power Calculation Method (3) of Near UE

In the third method, the UE respectively calculates data power thereof in the i-th layer and superposition coded interference power in the i-th layer as P/n*$a_{iS}$ and P/n*$a_{iI}$. Preferably, $a_{iS}$ and $a_{iI}$ satisfy all of the conditions of Equation 5.

$$\sum_{i=1}^{n}\left(\frac{a_{iS} + a_{iI}}{n}\right) = 1, a_{iS} \geq 0,$$ [Equation 5]

and $a_{iI} \geq 0$ for $0 < i < n+1$

The UE receives $a_{iS}$, $a_{iI}$ and index i from a BS through DCI or RRC signaling or detects the same through blind detection. When the UE performs blind detection, the BS can limit a search range of $a_{iS}$, $a_{iI}$ and index i and notify the UE of the limited search range to reduce BD complexity. If $a_{jI}$=0 or $a_{jI}$ is not signaled, the UE assumes that SPC has not been applied to the j-th layer and data power of the layer is P/n*$a_{jS}$.

Alternatively, the BS signals the number of layers to which SPC is applied, k, and the UE assumes that SPC has been applied to $1^{st}$, $2^{nd}$, $3^{rd}$, ..., $k^{th}$ layers among reception layers thereof and SPC has not been applied to other layers. In addition, layers to which SPC has been applied may be limited such that the condition of $a_{iS}$=$a_{jS}$ or $a_{iI}$=$a_{jI}$(i≠j) is always satisfied for simplified power distribution. For example, when the BS signals $a_{1S}$=0.4, $a_{1I}$=0.9, k=2 and n=3, the UE assumes that SPC has been applied to the $1^{st}$ and $2^{nd}$ layers, $a_{1S}$=$a_{2S}$=0.4 and $a_{1I}$=$a_{2I}$=0.9 and calculates data power of each layer and interference power. In addition, the UE assumes that SPC has not been applied to the remaining layer and data power of the layer is P/3*$a_{1S}$. Alternatively, the BS signals the number of layers to which SPC is applied, k, and the UE detects a layer to which SPC has been applied among the n reception layers thereof through blind detection (BD).

The above-described operation is the same as the power calculation method of a UE when the BS signals $a_S$=0.4, $a_{1I}$=0.9, k=2 and n=3 in the PDSCH power calculation method (2) of a near UE. This is because the PDSCH power calculation method (3) becomes identical to the PDSCH power calculation method (2) when the limiting condition of $a_{iS}$=$a_{jS}$ is added in the PDSCH power calculation method (3).

To simplify signaling or blind detection of MUST related information, a UE expects that a BS will apply SPC to all layers and transmit the same or will not apply SPC to all layers and transmit the same. Otherwise, the UE expects that the BS will perform MUST scheduling on layers to which SPC has been applied using the same value. For example, the UE expects that the above-proposed power distribution value or interference PDSCH power, MCS, resource allocation and the like will be equally applied to all layers to which SPC has been applied.

Figure 16:
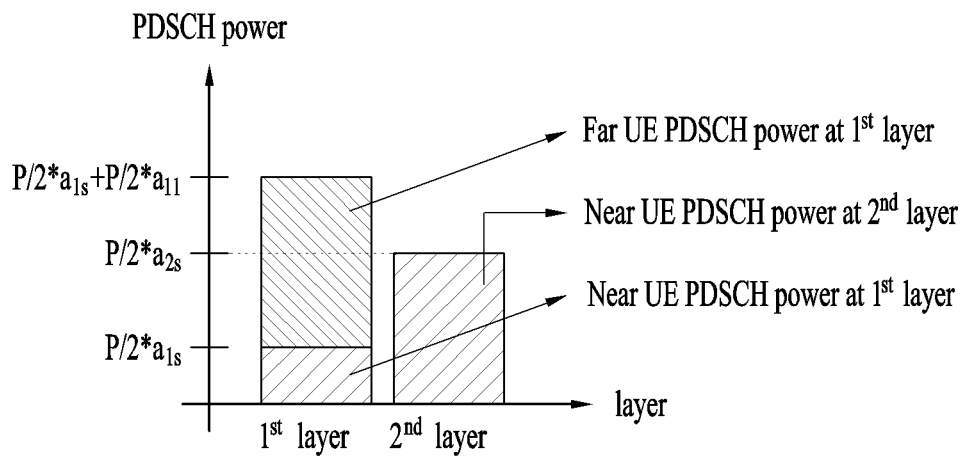
FIG. 16 illustrates an example of calculating PDSCH power of a near UE using a PDSCH power calculation method (3) of a near UE according to the first embodiment of the present invention.

FIG. 16 illustrates an example of calculating PDSCH power of a near UE using the PDSCH power calculation method (3) of a near UE according to the first embodiment of the present invention. Particularly, FIG. 16 assumes a case in which only the upper far UE exists and the lower far UE disappears in FIG. 11(*c*).

Figure 17:
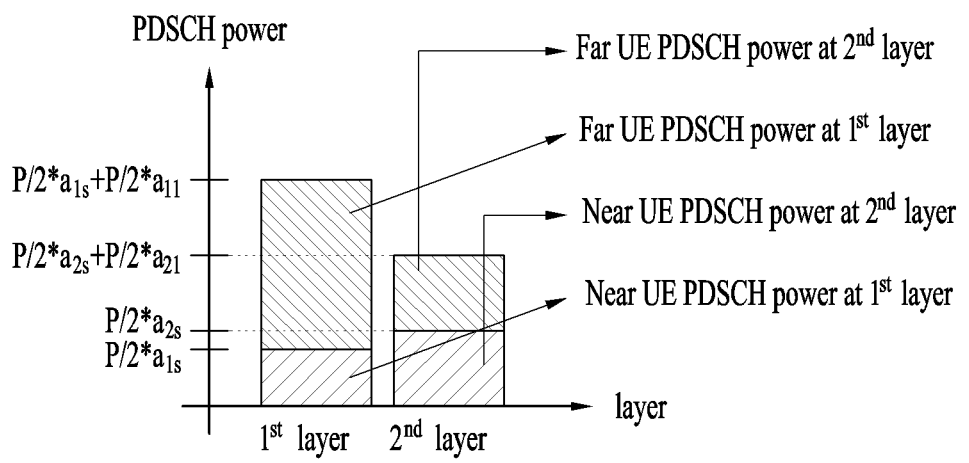
FIG. 17 illustrates another example of calculating PDSCH power of a near UE using the PDSCH power calculation method (3) of a near UE according to the first embodiment of the present invention.

FIG. 17 illustrates another example of calculating PDSCH power of a near UE using the PDSCH power calculation method (3) of a near UE according to the first embodiment of the present invention. Particularly, FIG. 17 assumes a case in which both the upper and lower far UEs exist in FIG. 11(c) and the case of FIG. 11(d).

PDSCH Power Calculation Method of Far UE

First, data power calculation methods of legacy UEs in CRS based transmission are arranged.

(1) In the case of rank 1, data power is not calculated if a data modulation scheme is QPSK because data information is loaded on a phase in QPSK and thus it is not necessary to calculate data power when decoding is performed.

(2) In the case of rank 1, $\rho_A$ and $\rho_B$ are calculated using $P_A$ and $P_B$ values and PDSCH receive power P is calculated from CRS receive power if a data modulation scheme is 16QAM, 64QAM or 256QAM.

(3) In the case of rank of 2 or higher, $\rho_A$ and $\rho_B$ are calculated using $P_A$ and $P_B$ values and PDSCH receive power P is calculated from CRS receive power irrespective of a modulation scheme. Particularly, the PDSCH receive power P is calculated for SU-MIMO SIC even when the data modulation scheme is QPSK.

(4) When servCellp-a-r12 which is a higher layer parameter is configured for a UE, $\rho_A$ and $\rho_B$ are calculated using $P_A'$ given by servCellp-a-r12 and $P_B$ and PDSCH receive power P is calculated from CRS receive power for data modulated using QPSK.

A data power calculation method of a far UE on the basis of the above-described operations (1) to (4) can be arranged as follows.

First, a case in which the PDSCH rank of the far UE is 1 as shown in FIG. 11(c) will be described.

When the rank is 1 and data modulated through QPSK is received, $\rho_A$ and $\rho_B$ are calculated using $P_A$ and $P_B$ values and PDSCH receive power P is calculated from CRS receive power. In addition, the far UE calculates data power thereof as $P*a_{1S}$. The data power can be used when MMSE IRC beamforming is calculated for interference mitigation.

When the rank is 1 and data modulated through 16QAM, 64QAM or 256QAM QPSK is received, $\rho_A$ and $\rho_B$ are calculated using $P_A$ and $P_B$ values and PDSCH receive power P is calculated from CRS receive power. In addition, the far UE calculates data power thereof as $P*a_{1S}$.

When the rank is 1, servCellp-a-r12, which is a higher layer parameter is configured for the UE, and data modulated through QPSK is received, $\rho_A$ and $\rho_B$ are calculated using $P_A'$ and $P_B$ values and PDSCH receive power P is calculated from CRS receive power. In addition, the far UE calculates data power thereof as $P*a_{1S}$. The data power can be used when MMSE IRC beamforming is calculated for interference mitigation.

Figure 18:
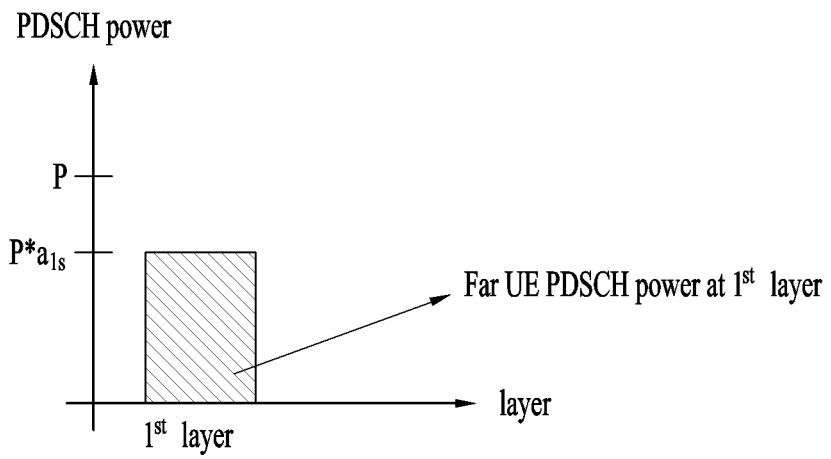
FIG. 18 illustrates an example of calculating PDSCH power of a far UE using a PDSCH power calculation method of a far UE according to the first embodiment of the present invention.

FIG. 18 illustrates an example of calculating PDSCH power of a far UE using the PDSCH power calculation method of a far UE according to the first embodiment of the present invention. Particularly, FIG. 18 assumes that the PDSCH rank of the far UE is 1.

Next, a case in which the PDSCH rank of the far UE is 2 as shown in FIG. 11(d) will be described. In the case of rank 2 or higher, $\rho_A$ and $\rho_B$ are calculated using $P_A$ and $P_B$ values and PDSCH receive power P is calculated from CRS receive power irrespective of a data modulation scheme. In addition, the far UE calculates power of data transmitted in the i-th layer thereof as $P/n*a_{iS}$ when the rank thereof is n (n>1).

Figure 19:
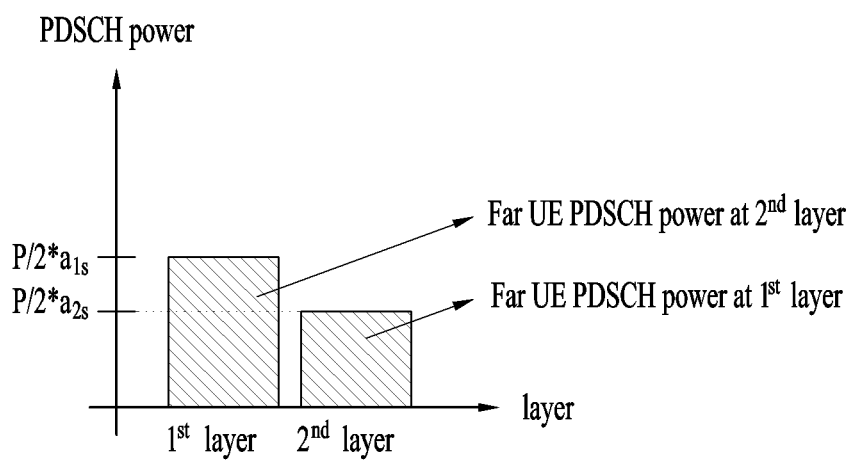
FIG. 19 illustrates another example of calculating PDSCH power of a far UE using the PDSCH power calculation method of a far UE according to the first embodiment of the present invention.

FIG. 19 illustrates another example of calculating PDSCH power of a far UE using the PDSCH power calculation method of a far UE according to the first embodiment of the present invention. Particularly, FIG. 19 assumes that the PDSCH rank of the far UE is 2.

A BS can notify a far UE of power information such as $a_{iS}$ and index i or the number of layers to which SPC is applied and the index of a layer to which SPC is applied using the above-proposed PDSCH power calculation methods of a near UE. Alternatively, the UE may detect some of such information through blind detection (BD) and the BS may limit a set of corresponding parameters and notify the UE of information on the set in order to aid in blind detection of the UE. Additionally, the BS may also notify the far UE of $a_{iI}$ information (data power information of a near UE) and use this information for an MMSE-IRC reception technique to reduce interference from the near UE.

In DM-RS based MUST, the BS may provide SPC related information (index i or the number of layers to which SPC is applied, the index of a layer to which SPC is applied, etc.) including power information to near/far UEs. Alternatively, the BS may limit a set of corresponding parameters and notify the UEs of information on the set to aid in blind detection.

Further, MUST related information provided by the BS to a near UE can be equally provided to a far UE, and the far UE can cancel interference of the near UE using the information.

In addition, a PDSCH power calculation method of near/far UEs in FIG. 11(b) will be described.

Rank-1 PMIs of the near/far UEs are signaled by the BS to the near/far UEs through DCI. Here, when a total rank (i.e., a total number of layers) is not known, an error is generated in data power calculation. This is because, although the near/far UEs assume that all transmit power is loaded in rank-1 layers thereof, the BS actually transmits data for the two layers, as shown in FIG. 11(b), and thus power is distributed to the two layers. To prevent such a malfunction, $\delta_{power\text{-}offset}$ in Equations 1 and 2 can be used in MUST. For example, the BS signals $\delta_{power\text{-}offset}$ of −3 dB to the near/far UEs such that the near/far UEs can recognize that transmit power is reduced by half in the rank-1 layers thereof in FIG. 11(b).

Alternatively, the BS may additionally notify the near/far UE of a total transmit rank, and the UEs may recognize their ranks and the total transmit rank and calculate transmit power in the layers thereof. For example, when the rank of a UE is 1 and the total transmit rank is n, the UE can be aware that transmit power is reduced by 1/n in the layer thereof. Consequently, the UE calculates power using $\delta_{power\text{-}offset}=10 \log(1/n)$ in Equations 1 and 2.

In addition, a method in which a UE ignores $P_A$ or $P_B$ and assumes data power and interference power may be considered. As described above, when CRS based MUST is performed, P is calculated using $P_A$ and $P_B$ and then data power and interference power are re-calculated on the basis of P in data power calculation methods of near/far UEs. In other methods, however, a UE may calculate data power and interference power from CRS measurement power without using $P_A$ and $P_B$. For example, when the CRS measurement power is $P_{CRS}$ and the transmit rank of the BS is R, the UE can calculate data power for the i-th layer thereof as $P_{CRS}/R*a_{iS}$ and calculate interference power for the i-th layer as $P_{CRS}/R*a_{iI}$. Alternatively, the UE may set R=1 all the time and calculate power by applying R to $a_{iS}$ and $a_{iI}$. That is, $a_{iS}'=a_{iS}/R$ is defined to replace $a_{iS}$ in the equation below. $a_{iI}'=a_{iI}/R$ may be defined to replace $a_{iI}$.

When only $P_B$ is applied without $P_A$, the UE calculates power in OFDM symbols in which a CRS is not transmitted, as described above, but needs to scale data power and interference power up or down by a predetermined ratio according to $P_B$ in OFDM symbol in which a CRS is transmitted. For example, when $P_B$ indicates $\rho_B/\rho_A=1$, data power and interference power are equal in an OFDM symbol in which a CRS is not transmitted and an OFDM symbol in which a CRS is transmitted. However, when $\rho_B/\rho_A=\frac{1}{2}$, data power and interference power in an OFDM symbol in which a CRS is transmitted are calculated by scaling down data power and interference power in an OFDM symbol in which a CRS is not transmitted by $\frac{1}{2}$.

Second Embodiment—Data Power Calculation Method of Near/Far UEs in DM-RS Based MUST Data Power Calculation Method (1) of Near UE A UE calculates data power $P_i$ for the i-th layer using DM-RS receive power of a corresponding port through the conventional method. Then, the UE calculates data power thereof and interference power using $a_{iS}$ and $a_{iI}$ as follows.

When SPC is applied to the i-th layer, the UE determines the data power thereof for the i-th layer as $P_i*a_{iS}$ and determines interference power for the i-th layer as $P_i* a_{iI}$.

When SPC is not applied to the i-th layer, the UE determines the data power thereof for the i-th layer as $P_i$ and determines interference power for the i-th layer as 0.

Here, $a_{iS}$ and $a_{iI}$ respectively represent a power ratio of data of the UE transmitted through the i-th layer of the UE and a power ratio of a superposition coded interference signal. In addition, $a_{iS}$ and $a_{iI}$ satisfy all of the conditions of Equation 6.

$$a_{iS}+a_{iI}=1,\ a_{iS} \geq 0,\ \text{and}\ a_{iI} \geq 0\ \text{for}\ 0<i<n+1 \quad \text{[Equation 6]}$$

A method of detecting/signaling a layer to which SPC is applied has been described in the above-described PDSCH power calculation methods (1) to (3) of a near UE in CRS based MUST and may be equally applied.

Figure 20:
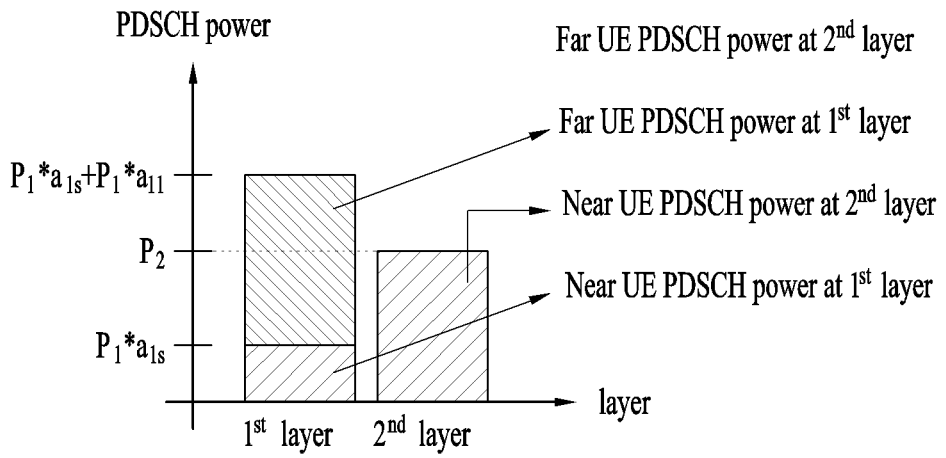
FIG. 20 illustrates an example of calculating PDSCH power of a near UE using a PDSCH power calculation method of a near UE according to a second embodiment of the present invention.
Figure 21:
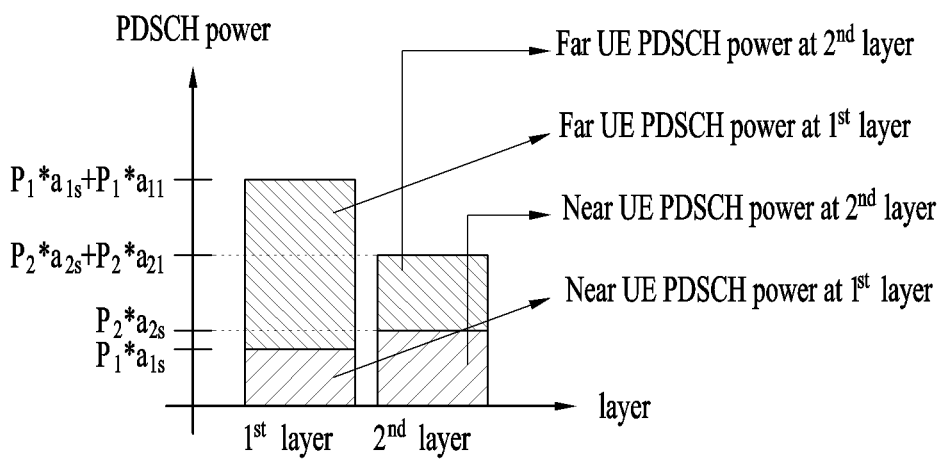
FIG. 21 illustrates another example of calculating PDSCH power of a near UE using the PDSCH power calculation method of a near UE according to the second embodiment of the present invention.

FIG. 20 illustrates an example of calculating PDSCH power of a near UE using a PDSCH power calculation method of a near UE according to a second embodiment of the present invention. FIG. 21 illustrates another example of calculating PDSCH power of a near UE using the PDSCH power calculation method of a near UE according to the second embodiment of the present invention.

In particular, FIGS. 20 and 21 illustrate a case in which a PDSCH rank is 2. FIG. 20 corresponds to a case in which SPC is applied to one layer and FIG. 21 corresponds to a case in which SPC is applied to two layers.

Data Power Calculation Method (1) of Far UE

Like a near UE, a far UE also calculates data power $P_i$ for the i-th layer using DM-RS receive power through the conventional method. Then, the far UE calculates data power thereof for the i-th layer as $P_i*a_{iS}$ using $a_{iS}$.

According to the aforementioned data power calculation method of a far UE, the far UE needs to be signaled $a_{iS}$ or to perform blind detection in order to calculate correct power but legacy far UEs do not know $a_{iS}$. Therefore, a data power calculation method (2) of near/far UEs described below can be considered.

Data Power Calculation Method (2) of Near UE

A UE calculates data power $P_i$ for the i-th layer using DM-RS receive power of a corresponding antenna port through the conventional method. Then, the UE calculates data power thereof and interference power using $a_{iS}$ and $a_{iI}$ as follows.

When SPC is applied to the i-th layer, the UE determines the data power thereof for the i-th layer as $P_i*a_{iS}$ and determines interference power for the i-th layer as $P_i$.

When SPC is not applied to the i-th layer, the UE determines the data power thereof for the i-th layer as P, and determines interference power for the i-th layer as 0.

Here, $a_{iS}$ and $a_{iI}$ respectively represent a power ratio of data of the UE transmitted through the i-th layer of the UE and a power ratio of a superposition coded interference signal. A method of detecting/signaling a layer to which SPC is applied has been described in the above-described PDSCH power calculation methods (1) to (3) of a near UE in CRS based MUST and may be equally applied.

Alternatively, a BS may signal $a_{iS}$ as a specific value to the UE. For example, when $a_{iS}=1$, the i-th layer is considered to correspond to $a_{iI}=0$ and assumed to be a layer to which SPC is not applied. Otherwise, a BS may signal $a_{iI}$ as a specific value to the UE. For example, the i-th layer is assumed to be a layer to which SPC is applied when $a_{iI}=1$ and is assumed to be a layer to which SPC is not applied when $a_{iI}=0$.

Figure 22:
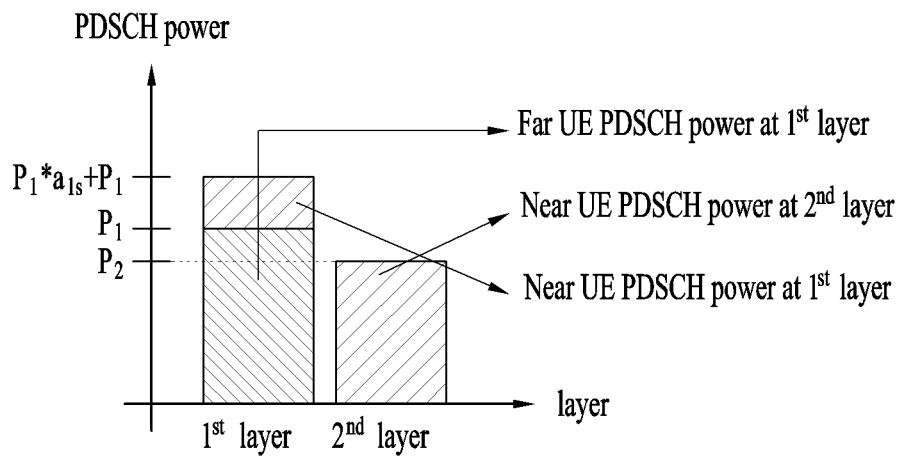
FIGS. 22 and 23 illustrate other examples of calculating PDSCH power of a near UE using the PDSCH power calculation method of a near UE according to the second embodiment of the present invention.
Figure 23:
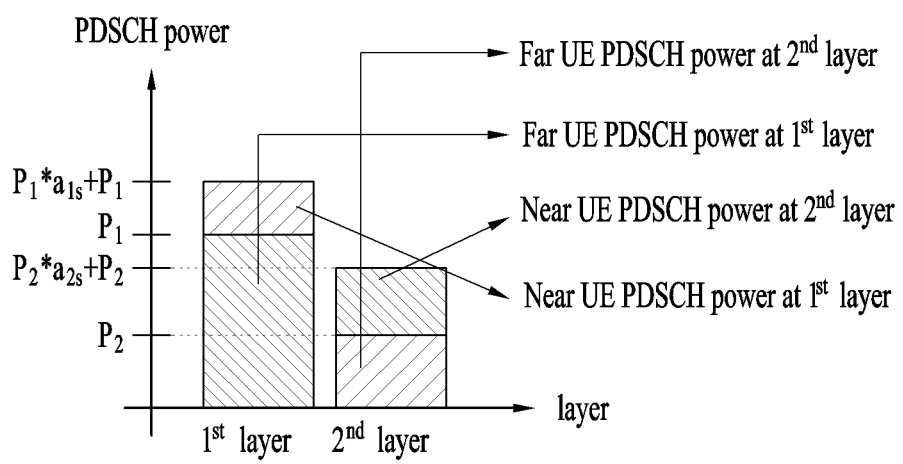

FIGS. 22 and 23 illustrate other examples of calculating PDSCH power of a near UE using the PDSCH power calculation method of a near UE according to the second embodiment of the present invention.

In particular, FIGS. 22 and 23 illustrate a case in which a PDSCH rank is 2. FIG. 22 corresponds to a case in which SPC is applied to one layer and FIG. 23 corresponds to a case in which SPC is applied to two layers.

Data Power Calculation Method (2) of Far UE

A UE calculates data power $P_i$ for the i-th layer using DM-RS receive power through the conventional method. That is, the UE calculates the data power thereof for the i-th layer as $P_i$.

Third Embodiment—Power Calculation Method in PMCH Transmission Through MUST

The above-described first and second embodiments assume an environment in which MUST is applied to PDSCH transmission. A third embodiment proposes a power calculation method of a UE when MUST is applied to PMCH transmission using an MBSFN RS (port 4).

According to the current LTE standard document, when a PMCH modulated using 16QAM or 64QAM is transmitted, a UE calculates power on the assumption that the ratio of a PMCH EPRE to an MBSFN RS EPRE is 0 dB, that is, they are equal.

When MUST is applied, a UE needs to estimate PMCH power in the following two aspects.

First, when MUST is applied, a BS superposition codes an HQ (high quality) PMCH and an LQ (low quality) PMCH and transmits the superposition coded PMCHs to a UE. Accordingly, the UE needs to be able to respectively calculate power of HQ data and power of LQ data.

Second, in the case of a PMCH modulated using QPSK, a PMCH also needs to be known. When MUST is applied, a BS superposition codes HQ data and LQ data and transmits the superposition coded data to a UE and thus the UE needs to know transmit power of data in order to generate a correct SPC constellation (superposed constellation) during demodulation.

Accordingly, a method of calculating PMCH transmit power as follows is proposed.

For an HQ PMCH modulated using QPSK, 16QAM or 64QAM, a UE assumes the ratio of a HQ PMCH EPRE to an MBSFN RS EPRE to be 10 log($a_{HQ}$) dB.

For an LQ PMCH modulated using QPSK, 16QAM or 64QAM, a UE assumes the ratio of an LQ PMCH EPRE to an MBSFN RS EPRE to be 10 log($a_{LQ}$) dB.

To simplify power distribution, a BS and a UE can agree that they meet the condition of $a_{HQ}+a_{LQ}=1$ all the time. $a_{HQ}$ and $a_{LQ}$ may be signaled by the BS to the UE through L1/L2 signaling, RRC signaling or the like or determined by the UE through blind detection. Alternatively, the BS and the UE may agree that $a_{HQ}$ and $a_{LQ}$ are determined as specific values according to a combination of two data modulation schemes.

When MUST is applied, the UE ignores previous $P_A$ and $P_B$ signaled through RRC signaling and assumes $P_A$ and $P_B$ to be specific values previously agreed upon between the UE and the BS. The specific values previously agreed upon between the UE and the BS are $P_A$ and $P_B$ values dedicated for MUST and may be signaled by the BS to the UE or set to fixed values without signaling. In addition, in the case of MUST, power of near UE data and power of far UE data are calculated using $P_A$ and $P_B$ even when a near UE data modulation scheme or a far UE data modulation scheme is QPSK.

Additionally, alternatives (a) and (b) described below are proposed as a method of signaling, by a BS which will detect data of a far UE, an MCS level of a near UE to the near UE only when the near UE knows an effective channel, signal strength and an MCS level (or modulation scheme) of the far UE.

a) The near UE checks an MCS level for data thereof through DCI. Then, the near UE blind-detects a far UE MCS within a limited MCS level set on the assumption that the BS has set a far UE MCS level to be lower than the MCS level for data thereof. For example, when the near UE MCS level is 10, the near UE blind-detects the far UE MCS below 10.

b) The BS signals, to the near UE, the MCS level of the near UE and the MCS level of the far UE. In addition, the BS signals, to the near UE, a power allocation set configured according to a combination of the MCS level of the near UE and the MCS level of the far UE. For example, the BS signals, to a UE, set 1 of power distribution information $a_I$ and $a_S$, which can be used when the MCS level of the near UE corresponds to QPSK and the MCS level of the far UE also corresponds to QPSK, through RRC signaling. In addition, the BS signals, to the UE, set 2 of power distribution information $a_I$ and $a_S$, which can be used when the MCS level of the near UE corresponds to QPSK and the MCS level of the far UE corresponds to 16QAM, through RRC signaling.

The UE checks the MCS level of the near UE and the MCS level of the far UE and then checks a set of $a_I$ and $a_S$ for a combination of the MCS levels (i.e., whether the set is set 1 or set 2). In addition, the UE is signaled which values in the set are used as $a_I$ and $a_S$ through DCI. Alternatively, the UE checks a set of $a_I$ and $a_S$ for an MCS level combination and blind-detects values in the set which are used as $a_I$ and $a_S$. Of course, the set of $a_I$ and $a_S$ for an MCS level combination can be predetermined and fixed.

In the above proposition, index i of $a_{iS}$ and $a_{iI}$ refers to a layer but may refer to a transport block (TB) index. Since each TB is transmitted through multiple layers according to rank and whether retransmission is performed, multiple layers connected to one TB have the same $a_{iS}$ and $a_{iI}$ values when i refers to a TB index.

Alternatively, whether SPC is applied may be determined per TB, and the BS signals a TB to which SPC, that is, MUST is applied to the UE. The UE expects that the BS performs MUST scheduling using the same value for layers corresponding to the TB to which SPC is applied. For example, the UE expects that the above-proposed power distribution value, power of an interference PDSCH, an MCS, a modulation order, resource allocation or the like is equally applied to ally layers corresponding to the TB to which SPC is applied.

According to the current 3GPP LTE standard document, when QPSK is designated as a data modulation scheme for a UE through DCI in a CRS based transmission mode (e.g., transmission mode 2 or transmission mode 6), the UE does not estimate data power from CRS receive power because information is loaded only in a phase component instead of power of a received signal in the case of QPSK. If the data modulation scheme is 16QAM or 64QAM, the UE calculates a power ratio of a CRS to DATA from $P_A$ and $P_B$ and then applies the power ratio to CRS receive power to estimate data power.

However, in the case of MUST, when a near UE which cancels data interference of a far UE is assigned QPSK as a modulation scheme thereof and does not estimate data power, a problem is generated because the near UE decodes data thereof on an SPC constellation (superposed constellation) in which data symbols thereof and interference data symbols are superposed. For example, when the modulation scheme of the near UE is QPSK and a modulation scheme of a far UE is QPSK, the SPC constellation is represented as 16QAM and the near UE demodulates data thereof on the 16QAM.

Accordingly, when MUST is performed (or a MUST mode is set by the BS), the near UE needs to estimate data power using $P_A$ and $P_B$ in the same manner as the case of 16QAM, 64QAM and 256 QAM even though the modulation scheme of the near UE is QPSK. $P_A$ and $P_B$ used in QPSK may be defined separately from conventional $P_A$ and $P_B$ and signaled and may have values different from conventional $P_A$ and $P_B$. Here, the UE estimates SPC constellation by additionally performing power distribution between data thereof transmitted through MUST and interference data for the data power estimated as above. Power distribution between data of the UE transmitted through MUST and interference data may be performed using the above-described methods.

In addition, when the modulation scheme of the UE is 16QAM or 64QAM, different $P_A$ and $P_B$ may be used according to whether MUST is applied. That is, when MUST is applied, the conventional $P_A$ and $P_B$ are used. When MUST is not applied, $P_A$ and $P_B$ which are newly defined and signaled are used.

According to the current 3GPP standard document, $P_A$ may be defined per UE. When MUST is applied, if a near UE and a far UE have different $P_A$ values, data transmit power of the near UE differs from that of the far UE and thus power distribution between data of the near UE and data of the far UE may become complicated. Accordingly, MUST can be performed upon limiting $P_A$ values of the two UEs to the same value all the time.

There may be multiple power ratios of near UE data to interference UE data. On the assumption that average power of symbols on the SPC constellation is 1, symbols of the SPC constellation have a uniform distribution as in 16QAM and a minimum distance between symbols among 16 symbols is maximized when the SPC constellation corresponds to superposition of QPSK_N for the near UE data and QPSK_F for the far UE data, power of QPSK_N is 0.2 and power of QPSK_F is 0.8.

In addition, when the SPC constellation corresponds to superposition of 16QAM_N for the near UE data and QPSK_F for the far UE data, power of 16QAM_N is 1-0.762 and power of QPSK_F is 0.762, the symbols of the SPC constellation have a uniform distribution as in 64QAM and a minimum distance between symbols among 64 symbols is maximized. Additionally, when the SPC constellation corresponds to superposition of 64QAM_N for the near UE data and QPSK_F for the far UE data, power of 64QAM_N is 1-0.753 and power of QPSK_F is 0.753, the symbols of the SPC constellation have a uniform distribution as in 256QAM and a minimum distance between symbols among 256 symbols is maximized.

Accordingly, when such values are considered as candidates for a power ratio, the performance of an interference cancellation (IC) receiver may be improved. However, as the number of defined power ratios increases, a degree of freedom of scheduling of a BS increases but power ratio signaling overhead or blind detection overhead also increases. Accordingly, an appropriate number of power ratios is 2 or 4.

When the number of power ratios is set to 2, the power ratios may be defined as {(0.2, 0.8), (1-0.762, 0.762)} such that uniform symbols can be generated. When a demodulation scheme of a far UE is limited to QPSK, uniform symbols can be generated according to (0.2, 0.8) and nonuniform symbols can be generated according to (1-0.762, 0.762) in an SPC constellation if a modulation scheme of a near UE is QPSK. The BS generates uniform or nonuniform symbols using one of the two power ratios with a degree of freedom and performs MUST. Similarly, if the modulation scheme of the far UE is 16QAM, nonuniform symbols can be generated according to (0.2, 0.8) and uniform symbols can be generated according to (1-0.762, 0.762) in the SPC constellation. The BS generates uniform or nonuniform symbols using one of the two power ratios with a degree of freedom and performs MUST.

However, if the modulation scheme of the far UE is 64QAM, nonuniform symbols are generated with the two power ratios, but there is little difference between power ratios (1-0.753, 0.753) and (1-0.762, 0.762) used to generate uniform symbols and thus a constellation closer to uniform symbols is generated using (1-0.762, 0.762).

When the number of power ratios is set to 3, the power ratios can be defined as {(0.2, 0.8), (1-0.762, 0.762), (1-0.753, 0.753)} such that uniform symbols are generated. As described above, an SPC constellation having a uniform distribution may be generated using one of the three power ratios and an SPC constellation having a nonuniform distribution may be generated using the remaining two values for each of QPSK_N+QPSK_F, 16QAM_N+QPSK_F and 64QAM_N+QPSK_F.

To increase the possibility of success of blind detection for a power ratio, it is desirable to set power ratio candidates such that they have a difference equal to or greater than a predetermined value therebetween. For example, a power ratio candidate set is defined as {(0.05, 0.95), (0.1, 0.9), (0.2, 0.8), (0.4, 0.6)} such that power ratio values of a near UE have a spacing of 3 dB.

However, in the case of a power ratio of (0.4, 0.6), symbol clusters are superposed in 16QAM_N+QPSK_F. That is, QPSK symbols of the first quadrant and 16QAM symbols are superposed to form one cluster and QPSK symbols of second to fourth quadrants and 16QAM symbols are superposed, to thereby form a total of four clusters. In this case, the four clusters are superposed on constellation coordinates in the case of the power ratio of (0.4, 0.6). Consequently, interference cancellation performance is deteriorated. To solve this problem, it is desirable to exclude the power ratio of (0.4, 0.6) from the power ratio candidate set.

In the above-described example, the same power ratio candidate set is defined irrespective of the modulation scheme of the near UE. However, different power ratio candidate sets may be defined depending on modulation schemes of the near UE to optimize a power ratio and improve MUST performance. For example, a power ratio candidate set of {(0.2,0.8), (x1,1-x1)} is defined when the SPC constellation corresponds to QPSK_N+QPSK_F, a power ratio candidate set of {(1-0.762, 0.762), (x2,1-x2)} is defined when the SPC constellation corresponds to 16QAM_N+QPSK_F and a power ratio candidate set of {(1-0.753, 0.753), (x3,1-x3)} is defined when the SPC constellation corresponds to 64QAM_N+QPSK_F such that uniform symbols or nonuniform symbols can be generated per modulation scheme combination.

A power ratio of (1, 0) may be added to all of the aforementioned power ratio candidate sets. Particularly, (1, 0) means that MUST is not performed. Further, subsets of the aforementioned power ratio candidate sets may be provided in order to reduce blind detection overhead or signaling overhead. Alternatively, a power ratio candidate set may be defined as a super set in order to increase a degree of BS scheduling freedom and MUST gain.

Alternatively, N power ratios may be defined as one set (which is referred to as a super power set) and the BS may signal, to a UE, a value M (M≤N) in the super power set and a subset of a super power set composed of M power ratios through RRC signaling. The BS may dynamically indicate one of the M power ratios to the UE or the UE may directly blind-detect one of the M power ratios. Alternatively, K power sets may be present and the BS may signal one power set to the UE through RRC signaling. The BS may dynamically indicate one of power ratios included in the power set to the UE or the UE may directly blind-detect one of the power ratios.

Meanwhile, when the SPC constellation corresponds to QPSK_N+QPSK_F, a minimum symbol distance increases for power ratios from (1, 0) to (0.2, 0.8) and decreases for power ratios exceeding (0.2, 0.8). Accordingly, when N power ratios are required, it is desirable to select the N power ratios in the range of (1, 0) to (0.2, 0.8) at an equal interval to form a power ratio set. Similarly, when the SPC constellation corresponds to 16QAM_N+QPSK_F, a minimum symbol distance increases for power ratios from (1, 0) to (1-0.762, 0.762) and decreases for power ratios exceeding (1-0.762, 0.762). Accordingly, when N power ratios are required, it is desirable to select the N power ratios in the range of (1, 0) to (1-0.762, 0.762) at an equal interval to form a power ratio set. Further, when the SPC constellation corresponds to 64QAM_N+QPSK_F, a minimum symbol distance increases for power ratios from (1, 0) to (1-0.753, 0.753) and decreases for power ratios exceeding (1-0.753, 0.753). Accordingly, when N power ratios are required, it is desirable to select the N power ratios in the range of (1, 0) to (1-0.753, 0.753) at an equal interval to form a power ratio set.

According to R1-156108 (Link-level performance evaluation for MUST) and R1-152762 (Discussion on Multiuser Superposition Schemes and Initial Link Level Results) which is a document disclosed by the applicant prior to the present application, the performance of a non-ideal interference cancellation receiver is considerably close to the performance of an ideal interference cancellation receiver when a power ratio allocated or to be allocated to a near UE is equal or less than 0.3. Accordingly, it is desirable to set a power ratio to 0.3 or less. To determine a power ratio set on the basis of such proposition, power ratios may be divided into three sections and an appropriate value may be selected in each section to determine a power ratio set.

That is, a power ratio set may be configured by defining a section in which power ratios exceed 0.2 and are equal to or less than 0.3 as section 1, defining a section in which power ratios exceed 0.1 and are equal to or less than 0.2 as section 2, defining a section in which power ratios exceed 0 and are equal to or less than 0.1 as section 3 and selecting one value in each section.

Particularly, when one value is selected in each section, it is desirable to select a value which maximizes a minimum symbol distance in the SPC constellation. In this case, a power ratio set per modulation scheme may be configured as shown in a) to c) below.

a) QPSK_N+QPSK_F: {0.3, 0.2, 0.1}

In the case of QPSK_N+QPSK_F, a value which maximizes a minimum symbol distance in section 1 is the largest value in section 1. Accordingly, this value is very close to 0.2 and thus there is little difference between the value and 0.2 selected in section 2. Therefore, it is desirable to configure a power ratio set using various power ratio values by exceptionally selecting 0.3 rather than selecting a value which maximizes the minimum symbol distance in section 1.

b) 16QAM_N+QPSK_F: {1-0.762, 0.2, 0.1}

When a power ratio set of 16QAM_N+QPSK_F is configured, it may be difficult for a UE to blind-detect a power ratio because there is a slight difference between 0. 1-0.762 and 0.2. Accordingly, it may be desirable to exclude 0.2 from the power ratio set and configure a power ratio set including 0.3.

c) 64QAM_N+QPSK_F: {1-0.753, 0.2, 0.1}

It is possible to indicate that MUST is not applied by adding 1 to the aforementioned power ratio set.

When power information per layer is individually transmitted, a BS may notify a UE of MUST ON/OFF information of each layer, that is, information indicating presence or absence of MUST interference, through the power information per layer. That is, the BS signals $a_S=1$ for a specific layer to the UE to inform the UE that MUST is not applied to the layer and normal data transmission, that is, non-MUST, is performed.

For example, 2-bit DCI signaling can be defined per layer and information indicating that non-MUST is performed, that is, MUST interference is not present, can be joint-encoded with power information as shown in Table 3. In addition, to reduce signaling overhead, a common value may be applied to all layers.

TABLE 3

| State 00 | non-MUST or a = 1 |
| State 01 | a = c1 |
| State 10 | a = c2 |
| State 11 | a = c3 |

In Table 3, c1, c2 and c3 may vary according to combinations of modulation orders of a far UE and a near UE. To reduce signaling overhead, a BS may signal whether non-MUST is performed to a UE per layer and power information may be defined as layer-common information. Alternatively, whether non-MUST is performed may be commonly signaled for layers and power information may be defined per layer and signaled to a UE by the BS.

Figure 24:
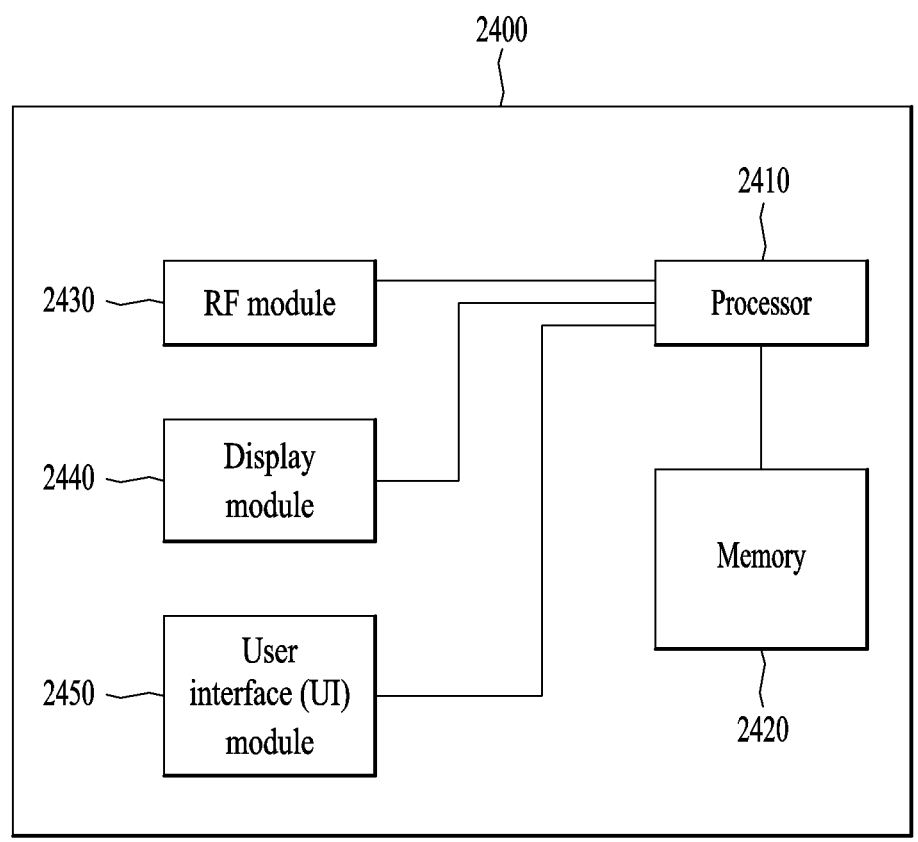
FIG. 24 is a block diagram of a communication apparatus according to an embodiment of the present disclosure.

FIG. 24 is a block diagram of a communication apparatus according to an embodiment of the present disclosure.

Referring to FIG. 24, a communication apparatus 2400 includes a processor 2410, a memory 2420, an RF module 2430, a display module 2440, and a User Interface (UI) module 2450.

The communication device 2400 is shown as having the configuration illustrated in FIG. 24, for the convenience of description. Some modules may be added to or omitted from the communication apparatus 2400. In addition, a module of the communication apparatus 2400 may be divided into more modules. The processor 2410 is configured to perform operations according to the embodiments of the present disclosure described before with reference to the drawings. Specifically, for detailed operations of the processor 2410, the descriptions of FIGS. 1 to 23 may be referred to.

The memory 2420 is connected to the processor 2410 and stores an Operating System (OS), applications, program codes, data, etc. The RF module 2430, which is connected to the processor 2410, upconverts a baseband signal to an RF signal or downconverts an RF signal to a baseband signal. For this purpose, the RF module 2430 performs digital-to-analog conversion, amplification, filtering, and frequency upconversion or performs these processes reversely. The display module 2440 is connected to the processor 2410 and displays various types of information. The display module 2440 may be configured as, not limited to, a known component such as a Liquid Crystal Display (LCD), a Light Emitting Diode (LED) display, and an Organic Light Emitting Diode (OLED) display. The UI module 2450 is connected to the processor 1910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the above description focuses on examples in which the downlink power allocation method in a wireless communication system and the apparatus therefor are applied to 3GPP LTE, the downlink power allocation method in a wireless communication system and the apparatus therefor are applicable to various wireless communication systems in addition to 3GPP LTE.

The invention claimed is:

1. A method of transmitting a downlink signal by a base station in a wireless communication system, the method comprising:
    transmitting, to a near user equipment (UE), information on a first ratio of transmit power of data for the near UE to total transmit power and information on a second ratio of interference power to the total transmit power;
    allocating the total transmit power to the data for the near UE and data for a far UE; and
    transmitting the data for the near UE through a plurality of layers and transmitting the data for the far UE through at least one of the plurality of layers, based on the allocated total transmit power,
    wherein the data for the near UE and the data for the far UE are transmitted through same time resources and same frequency resources, and transmit power of the data for the near UE is allocated as a same value for each of the plurality of layers.

2. The method according to claim 1, wherein the allocating of the total transmit power comprises:
    allocating the transmit power of the data for the near UE as the same value for each of the plurality of layers based on the information on the first ratio; and
    allocating transmit power of the data for the far UE for at least one of the plurality of layers based on the information on the second ratio.

3. The method according to claim 1, wherein, when the data for the far UE is transmitted through two or more of the plurality of layers, the information on the second ratio is equally applied to the two or more layers.

4. The method according to claim 1, wherein, when the data for the far UE is transmitted through two or more of the plurality of layers, the information on the second ratio is provided for each of the two or more layers.

5. The method according to claim 1, wherein the information on the first ratio and the information on the second ratio satisfy the following equation:

$$\frac{1}{n}\sum_{i=1}^{n}(a_s + a_{il}) = 1$$

wherein $a_S$ is the information on the first ratio which is an integer equal to or greater than 0, $a_{il}$ is the information on the second ratio which is an integer equal to or greater than 0, i is an index of the plurality of layers and n is a rank value of the near UE.

6. A base station (BS) in a wireless communication system, the BS comprising:
    a wireless communication transceiver configured to transmit and receive signals to and from a near user Equipment (UE) and a far UE; and
    a processor configured to process the signals,
    wherein the processor is configured to:
        control the wireless communication transceiver to transmit, to the near UE, information on a first ratio of transmit power of data for the near UE to total transmit power and information on a second ratio of interference power to the total transmit power,
        allocate the total transmit power to the data for the near UE and data for the far UE,
        control the wireless communication transceiver to transmit the data for the near UE through a plurality of layers based on the allocated total transmit power, and
        control the wireless communication transceiver to transmit the data for the far UE through at least one of the plurality of layers,
    wherein the data for the near UE and the data for the far UE are transmitted through same time resources and same frequency resources, and the processor allocates transmit power of the data for the near UE as a same value for each of the plurality of layers.

7. The BS according to claim 6, wherein the processor allocates the transmit power of the data for the near UE as the same value for each of the plurality of layers based on the information on the first ratio and allocates transmit power of the data for the far UE for at least one of the plurality of layers based on the information on the second ratio.

8. The BS according to claim 6, wherein, when the data for the far UE is transmitted through two or more of the plurality of layers, the information on the second ratio is equally applied to the two or more layers.

9. The BS according to claim 6, wherein, when the data for the far UE is transmitted through two or more of the plurality of layers, the information on the second ratio is provided for each of the two or more layers.

10. The BS according to claim 6, wherein the information on the first ratio and the information on the second ratio satisfy the following equation:

$$\frac{1}{n}\sum_{i=1}^{n}(a_s + a_{il}) = 1$$

wherein $a_S$ is the information on the first ratio which is an integer equal to or greater than 0, $a_{il}$ is the information on the second ratio which is an integer equal to or greater than 0, i is an index of the plurality of layers and n is a rank value of the near UE.

* * * * *